(12) United States Patent
Jiang et al.

(10) Patent No.: US 11,778,663 B1
(45) Date of Patent: Oct. 3, 2023

(54) METHODS AND SYSTEMS FOR ENABLING COMMUNICATIONS FROM A STATION TO AN ACCESS POINT USING A BACKOFF COUNTER AND CARRIER SENSING

(71) Applicant: Marvell International Ltd., Hamilton (BM)

(72) Inventors: Jinjing Jiang, San Jose, CA (US); Liwen Chu, San Ramon, CA (US); Lei Wang, San Diego, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 1202 days.

(21) Appl. No.: 15/710,707

(22) Filed: Sep. 20, 2017

Related U.S. Application Data

(60) Provisional application No. 62/396,966, filed on Sep. 20, 2016.

(51) Int. Cl.
| | |
|---|---|
| *H04W 56/00* | (2009.01) |
| *H04W 74/08* | (2009.01) |
| *H04L 1/1829* | (2023.01) |
| *H04W 72/23* | (2023.01) |
| *H04W 72/1268* | (2023.01) |

(Continued)

(52) U.S. Cl.
CPC ....... *H04W 74/0816* (2013.01); *H04L 1/1848* (2013.01); *H04W 56/001* (2013.01); *H04W 56/002* (2013.01); *H04W 72/1268* (2013.01); *H04W 72/23* (2023.01); *H04W 74/004* (2013.01); *H04L 49/90* (2013.01); *H04W 76/20* (2018.02)

(58) Field of Classification Search
CPC . H04W 74/008; H04W 74/0833–0858; H04W 74/00; H04W 74/0816; H04W 72/042; H04W 76/20; H04W 56/001; H04W 56/002; H04W 74/0891; H04W 72/1268; H04W 74/004; H04L 1/1848; H04L 49/90
See application file for complete search history.

(56) References Cited

U.S. PATENT DOCUMENTS

| | | | |
|---|---|---|---|
| 2004/0093421 A1* | 5/2004 | Peng | H04W 74/0841 709/232 |
| 2006/0217125 A1* | 9/2006 | Miyazaki | H04W 74/0808 455/453 |

(Continued)

OTHER PUBLICATIONS

U.S. Appl. No. 62/069,964, filed Oct. 29, 2014, 11 pages.

*Primary Examiner* — Salvador E Rivas

(57) ABSTRACT

A method for communicating with an access point by a station. The station receives a first signal including an indication of a plurality of channels. The first signal is received from an access point. The station modifies a counter value in in response to receiving the first signal. The station further compares the counter value to a threshold value and selects a channel of the plurality of channels in response to determining the counter value corresponds to the threshold value. The station determines whether the selected channel is busy or idle. The station modifies the counter value in in response to determining that the selected channel is busy. The station transmits a second signal using the selected channel in response to determining that the selected channel is idle.

20 Claims, 16 Drawing Sheets

(51) Int. Cl.
*H04W 74/00* (2009.01)
*H04L 49/90* (2022.01)
*H04W 76/20* (2018.01)

(56) References Cited

U.S. PATENT DOCUMENTS

| | | | |
|---|---|---|---|
| 2007/0110092 A1* | 5/2007 | Kangude | H04W 74/0825 370/448 |
| 2007/0115877 A1* | 5/2007 | Zhen | H04W 72/10 370/329 |
| 2007/0237125 A1* | 10/2007 | Ohuchi | H04W 16/04 370/338 |
| 2008/0212476 A1* | 9/2008 | Konradsson | H04W 74/085 370/235 |
| 2008/0225717 A1* | 9/2008 | Chen | H04W 28/02 370/235 |
| 2009/0310620 A1* | 12/2009 | Yoshizawa | H04L 12/413 370/461 |
| 2010/0061235 A1* | 3/2010 | Pai | H04L 47/10 370/230.1 |
| 2010/0317383 A1* | 12/2010 | Lee | H04W 52/46 455/501 |
| 2012/0128045 A1* | 5/2012 | Ling | H04L 47/10 375/222 |
| 2012/0201219 A1 | 8/2012 | Wager et al. | |
| 2012/0207197 A1* | 8/2012 | Lv | H04M 11/062 375/224 |
| 2012/0224484 A1* | 9/2012 | Babiarz | H04L 43/0876 370/235 |
| 2013/0070627 A1 | 3/2013 | Chen et al. | |
| 2014/0079003 A1* | 3/2014 | Noh | H04L 5/001 370/329 |
| 2014/0086169 A1* | 3/2014 | Bao | H04W 48/12 370/329 |
| 2014/0133330 A1* | 5/2014 | Chapman | H04L 69/323 370/252 |
| 2015/0245335 A1 | 8/2015 | Zhou et al. | |
| 2016/0112322 A1* | 4/2016 | Benton | H04L 12/12 370/232 |
| 2016/0113034 A1 | 4/2016 | Seok | |
| 2016/0128024 A1 | 5/2016 | Frederiks et al. | |
| 2016/0128102 A1 | 5/2016 | Jauh et al. | |
| 2016/0183305 A1 | 6/2016 | Huang et al. | |
| 2016/0316473 A1* | 10/2016 | Wang | H04W 72/0453 |
| 2017/0013610 A1 | 1/2017 | Lee et al. | |
| 2017/0048810 A1* | 2/2017 | Sahlin | H04L 27/26 |
| 2017/0093605 A1* | 3/2017 | Huang | H04L 27/2666 |
| 2017/0181039 A1* | 6/2017 | Adachi | H04W 48/10 |
| 2017/0265159 A1* | 9/2017 | Kasami | H04W 56/00 |
| 2017/0366329 A1* | 12/2017 | Cao | H04L 5/0005 |
| 2018/0115981 A1* | 4/2018 | Kim | H04W 74/0808 |
| 2018/0145816 A1* | 5/2018 | Ahn | H04W 72/23 |
| 2018/0152918 A1* | 5/2018 | Green | H04W 72/0453 |
| 2018/0160451 A1* | 6/2018 | Butt | H04W 74/0833 |
| 2019/0253989 A1* | 8/2019 | Bengtsson | H04W 56/001 |
| 2020/0021996 A1* | 1/2020 | Harrod | A61B 5/00 |
| 2020/0344645 A1* | 10/2020 | Ahn | H04W 28/06 |

\* cited by examiner

METHODS AND SYSTEMS FOR ENABLING COMMUNICATIONS FROM A STATION TO AN ACCESS POINT USING A BACKOFF COUNTER AND CARRIER SENSING

CROSS-REFERENCE TO RELATED APPLICATION

This disclosure claims the benefit under 35 U.S.C. § 119(e) of U.S. Provisional Application No. 62/396,966, filed Sep. 20, 2016, which is herein incorporated by reference in its entirety.

FIELD OF USE

This disclosure is related to systems and methods for enabling uplink (UL) communications from stations to access points using an orthogonal frequency division multiple access (OFDMA) communication scheme with carrier sensing capability.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

A wireless local area network (WLAN) Basic Service Set (BSS) often comprises an access point and multiple stations that communicate with each other. OFDMA may allow multiple stations to communicate with the access point using multiple channels. The access point may provide a list of available channels to each station, and let the stations contend for available channels. For example, each station may contend for available channels by setting a backoff counter to a value in a certain range. The backoff counter may be decremented at certain intervals or upon a receiving a trigger from the access point. Each station may only attempt to transmit on one of the available channels when its respective backoff counter reach a certain threshold. In some cases, a station may attempt to transmit on a channel that is busy with a transmission from a different station or from the access point. Such transmissions on a busy channel may result in undesirable collisions or transmission failures which adds latency to the network and degrades the overall system performance.

SUMMARY

A method is disclosed for communicating with an access point. The method includes receiving from an access point, at a station a first signal that includes an indication of a plurality of channels. The method father includes, in response to receiving the first signal, modifying a counter value. The counter value is compared to a threshold value. In response to determining the counter value corresponds to the threshold value, a channel of the plurality of channels is selected. The method further includes, in response to determining that the selected channel is busy, modifying the counter value; and in response to determining that the selected channel is idle, transmitting a second signal using the selected channel. In one implementation of the method, the second signal is transmitted to the access point In one implementation of the method, determining at the station, whether the selected channel is busy or idle includes performing at least one of physical carrier sensing of the selected channel and virtual carrier sensing of the selected channel.

In one implementation of the method, determining at the station, whether the selected channel is busy or idle is performed in response to determining that the first signal includes a carrier sensing flag.

In one implementation of the method, the second signal is transmitted to the access point modifying the counter value in response to determining that the selected channel is busy is performed by recovering the counter value that existed prior to the counter value being modified in response to receiving the first signal. In another implementation of the method, the value is modified by: increasing a range associated with the counter value and modifying the counter value based on the increased range associated with the counter value. In one variant of such an implementation of the method, the value is modified by setting the counter value to a value that is randomly selected from the increased range associated with the counter value.

In one implementation of the method, the value is modified by setting the counter value to a value that is randomly selected from a range associated with the counter value.

A systems is disclosed for communicating with an access point. The system includes a station that includes control circuitry. The control circuitry may be configured to receive, from an access point, a first signal including an indication of a plurality of channels. The control circuitry may also be configured to modify a counter value in response to receiving the first signal. The control circuitry may also be configured to select a channel of the plurality of channels in response to determining the counter value corresponds to the threshold value. The control circuitry may also be configured to determine whether the selected channel is busy or idle. The control circuitry may further be configured to modify the counter value in response to determining that the selected channel is busy; and transmit a second signal using the selected channel in response to determining that the selected channel is idle. In one implementation of the system, the control circuitry is configured to transmit the second signal to the access point.

In one implementation of the system, the control circuitry is configured to determine whether the selected channel is busy or idle by performing at least one of physical carrier sensing of the selected channel and virtual carrier sensing of the selected channel.

In one implementation of the system, the control circuitry is configured to determine whether the selected channel is busy or idle in response to determining that the first signal includes a carrier sensing flag.

In one implementation of the system, the control circuitry is configured to modify the counter value by recovering the counter value that existed prior to the counter value being modified in response to receiving the first signal in response to determining that the selected channel is busy. In one implementation of the system the control circuitry is configured to increase a range associated with the counter value, and modify the counter value based on the increased range associated with the counter value in response to determining that the selected channel is busy. In one variant of such an implementation of the system, the control circuitry is configured to modify the counter value based on the increased range associated with the counter value by setting the counter value to a value that is randomly selected from the increased range associated with the counter value.

In one implementation of the system, the control circuitry is configured to modify the counter value by setting the counter value to a value that is randomly selected from a range associated with the counter value in response to determining that the selected channel is busy.

Another method is disclosed for communicating with an access point. The method includes receiving at a station, from an access point, a first signal including an indication of a plurality of channels; and designating a subset of the plurality of channels. Each channel of the subset of the plurality of channels may be determined to be idle. The method further includes modifying at the station, a counter value based on how many channels there are in the subset of the plurality of channels and comparing the counter value to a threshold value. The method further includes selecting a channel of the subset of the plurality of channels in response to determining that the counter value corresponds to the threshold value. The method further includes transmitting at the station, a second signal using the selected channel. In one implementation of the method, the second signal is transmitted to the access point.

In one implementation of the method, determining whether each channel of the subset of the plurality of channels is idle includes performing at least one of physical carrier sensing of that channel and virtual carrier sensing of that channel.

In one implementation of the method, determining whether each channel of the subset of the plurality of channels is idle is performed in response to determining that the first signal includes a carrier sensing flag.

BRIEF DESCRIPTION OF THE DRAWINGS

Further features of the disclosure, its nature, and various advantages will be apparent upon consideration of the following detailed description, taken in conjunction with the accompanying drawings, in which.

DETAILED DESCRIPTION

To provide an overall understanding of the disclosure, certain illustrative embodiments will now be described, including systems and methods for contention based uplink orthogonal frequency division multiple access (UL OFDMA) communications. However, the systems and methods described herein may be adapted and modified as is appropriate for the application being addressed, and the systems and methods described herein may be employed in other suitable applications.

Figure 1:
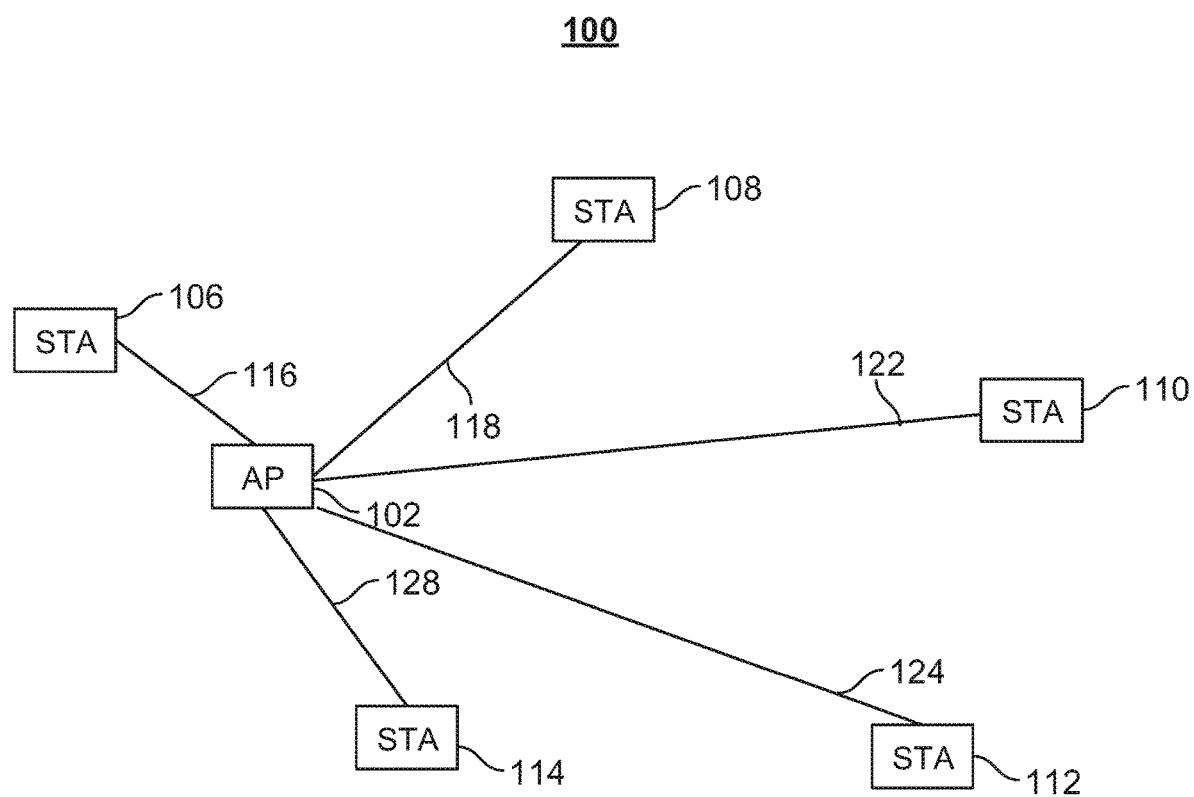
FIG. 1 shows a block diagram of an illustrative wireless local area network, in accordance with some embodiments of the present disclosure.

FIG. 1 shows a block diagram of an illustrative wireless network 100, incorporating embodiments of the present disclosure. For example, wireless network 100 may be a Wi-Fi network based on 802.11 protocol standards or a Bluetooth network. It is understood that wireless network 100 may include a different configuration of access points and stations than shown, or employ a different protocol than Wi-Fi or Bluetooth to create a wireless network.

Wireless network 100 may include access points and stations. Access points such as AP 102 may be devices that allow wireless-enabled devices to connect to a network. Wireless network 100 may include any number of access points.

Stations such as STA 106, STA 108, STA 110, STA 112, and STA 114 may be wireless-enabled devices that communicate such access points to connect wirelessly to a network. For example, a station may be a computer, phone, or tablet trying to connect to a Wi-F: Internet network. It is not necessary for all stations to be the same type of device. Wireless network 100 may include any number of stations.

Both access points and stations may include control circuitry to enable them to perform data processing, communicate with each other, and store data. The access point and stations may use their control circuitry to perform the steps and processes described in this description.

Connections 116, 118, 122, 124, and 128 represent possible communication links. A possible communication link may enable a station to receive information from a network through an access point. possible communication link may also enable a station to send information to a network through an access point. A possible communication link may also enable communications between access points and stations. An access point may be able to communicate with any number of stations. For example, AP 102 may have five possible communication links 116, 118, 122, 124, and 128. In some embodiments, an access point may have a possible communication link with another access point. A station may have possible communication links with any number of access points.

Each possible communication link 116, 118, 122, 124, and 128 may be a half-duplex link. That is, each possible communication link may be used by only one of its endpoints at any given time. For example, STA 106 may transmit information to AP 102 using possible communication link 116. During the duration of this transmission, AP 102 may not be able to use possible communication link 116 to simultaneously transfer information to STA 106.

Possible communication links 116, 118, 122, 124, and 128 may all utilize sub-channels of the same communication channel. As referred to herein, channels refer to communications frequencies used to transmit signals, and sub-channels refer to orthogonal frequencies used by the OFDMA protocol. For example, communications links may all occur on orthogonal sub-channels of the same channel using OFDMA protocol. Hence, more than one access point and station may be able to communicate using sub-channels of the same channel. For example, AP 102 may simultaneously receive communications from STA 106 and STA 114, each using different sub-channels of the same channel. In some embodiments, an access point or station may be able to transmit information simultaneously through more than one possible communication link.

AP 102 may transmit management frames to manage the flow of information and connections in wireless network 100. AP 102 may transmit management frames as signals through communication links 116, 118, 122, 124, and 128. AP 102 may also broadcast management frames as signals that can be picked up by devices not connected to wireless network 100. Management frames may include Beacon frames, which contain information used to synchronize devices connected to wireless network 100 and help new devices connect to wireless network 100. Beacon frames may be transmitted from access points to stations. Management frames may include Probe Request frames, which are transmitted by stations to form a new communication link with an access point. Management frames may include Probe Response frames, which are transmitted by access points in response to Probe Request frames. Management frames may include Association Request frames, which are transmitted by authenticated stations to request an Association ID. Management frames may include Association Response frames, which are transmitted by access points in response to Association Request frames, and may include an Association ID for an authenticated station. In some embodiments, all types of management frames may be transmitted by both access points and stations in wireless network 100.

In some embodiments, AP 102 may not know which stations they want to communicate with them. In some embodiments, AP 102 may use UL OFDMA contention-based protocols to begin communications with stations they have not communicated with before. In some embodiments, some stations may have low power and hence use low bandwidths to communicate with AP 102. For example, if STA 114 has a power constraint, STA 114 may use frequencies lower than MHz to communicate with AP 102.

In some embodiments, stations such as STA 106, STA 108, STA 110, STA 112, and STA 114 may have physical (PHY) or virtual carrier sensing capability. For example, STA 106 may be able to perform carrier sensing on communication link 116. In some embodiments, STA 106 may use radio hardware to physically sense whether communication link 116 is busy or idle.

In some embodiments, STA 106 may perform virtual carrier sensing to determine whether communication link 116 is busy or idle. For example, to perform virtual carrier sensing, STA 106 may use Network Allocation Vector (NAV) information that includes information from other stations (e.g. STA 108, STA 110, STA 112, and STA 114) and/or AP 102 about scheduled duration of transmissions on particular channels. For example, a transmission from STA 108, may include a header, e.g., a media access control (MAC) header, or a preamble that lists the duration of that transmission. In some embodiments, STA 106 may gather such duration information and create NAV information that tracks which channels are expected to be busy and at what times based on the gathered information. STA 106 may then use the NAV information to check if a certain channel is busy or idle at a certain time. In some embodiments, STA 106 may receive NAV information from a different station e.g. STA 108, STA 110, STA 112, and STA 114) or from an access point (e.g., AP 102).

In some embodiments, each one of the stations STA 106, STA 108, STA 110, STA 112, and STA 114 may be able to perform carrier sensing on any of the communication links 116, 118, 124, and 128, or on any other channel or sub-channel.

In some embodiments, AP 102 may instruct each of the stations STA 106, STA 108, STA 110, STA 112, and STA 114 whether to perform carrier sensing. For example, transmission from AP 102 to STA 106 may include a CS (carrier sensing) flag. In some embodiments, when the CS flag is set to a value of "1," the STA 106 will perform carrier sensing, and when the CS flag is set to a value of "0," the STA 106 will not perform carrier sensing. In some embodiments, CS flag may also indicate whether to perform PHY sensing, virtual sensing, or any combination of the two.

Figure 2:
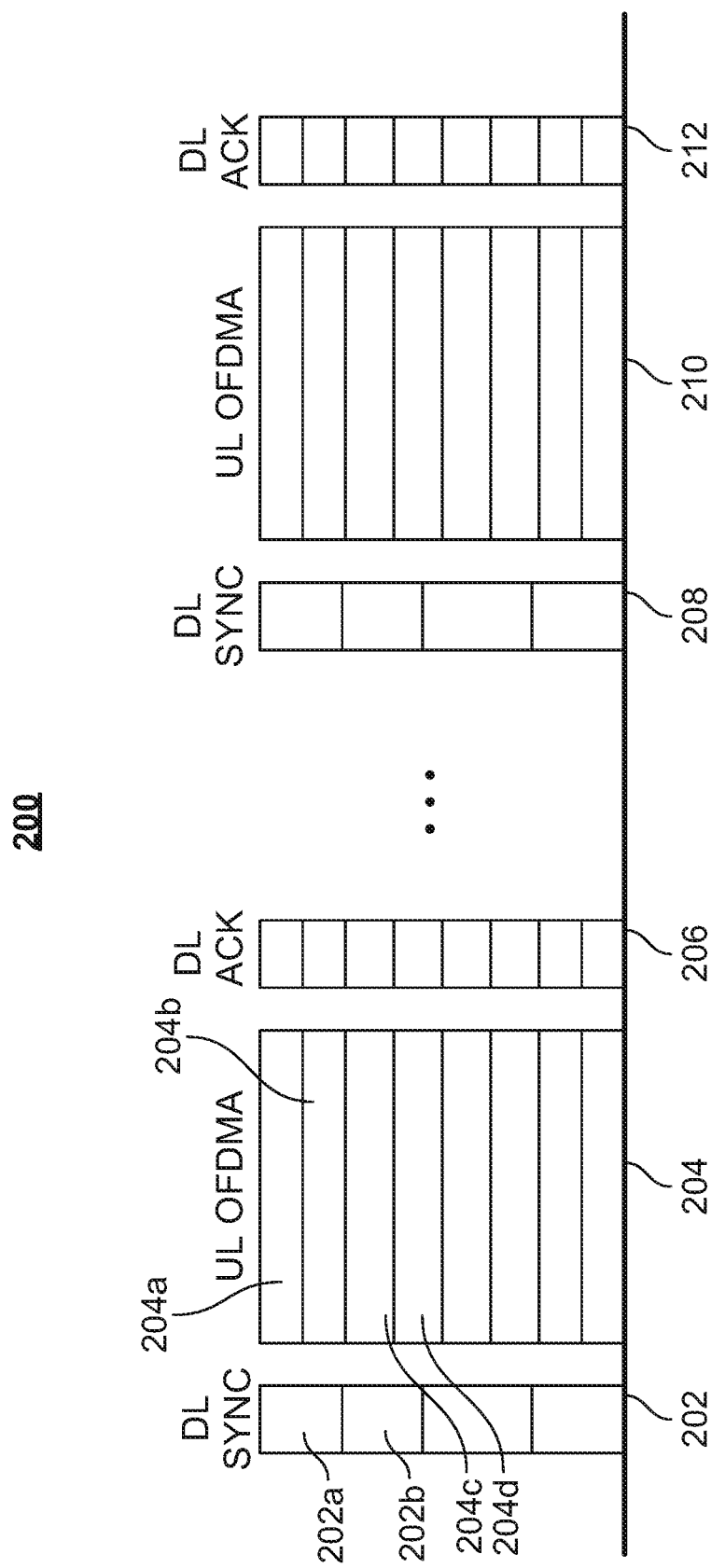
FIG. 2 shows an illustrative transmission timeline for a contention-based UL OFDMA communication, in accordance with some embodiments of the present disclosure.

FIG. 2 shows an illustrative transmission timeline 200 for a contention-based UL OFDMA communication, incorporating embodiments of the present disclosure. Timeline 200 progresses chronologically from left to right. Timeline 200 shows the communications occurring simultaneously on one of the possible communication links 116, 118, 122, 124, and 128. Each element on timeline 200 represents a signal that is transmitted between an access point and a station, and the width of each element on timeline 200 represents the length of the transmission. It is understood that timeline 200 may not be shown to scale, and the lengths of transmission of different elements may differ from those shown in FIG. 2.

DL SYNC 202 is a downlink synchronization signal broadcast from an access point to multiple stations within the range of the access point. As referred to herein, "downlink" or "DL" signals are those sent from an access point to one or more stations.

DL SYNC 202 may be broadcast on one or more channels. DL SYNC 202 acts as a trigger to alert stations that a UL OFDMA process will be beginning on one or more sub-channels, which may include unicast UL OFDMA transmissions and/or contention-based UL OFDMA transmissions. For example, DL SYNC 202 is broadcast on channel 202a. DL SYNC 202 indicates that a contention-based UL OFDMA process will begin on sub-channels 204a and 204b. As referred to herein, unicast UL OFDMA transmissions may be between an access point and a station, while contention-based UL OFDMA transmissions may be between an access point and multiple stations. In some embodiments, DL SYNC 202 may be referred to as a trigger frame. It is understood that DL SYNC 202 may be broadcast on any number of channels, and each channel may contain any number of sub-channels. For example, DL SYNC 202 may also be broadcast on channel 202b, which includes sub-channels 204c and 204d. The access point may use DL SYNC 202 to indicate which channels and sub-channels will be available for UL OFDMA 204.

UL OFDMA 204 is an uplink orthogonal frequency division multiple access signal. As referred to herein, "uplink" or "UL" signals are those sent from stations to one or more access points. The access point may receive communications from several stations on different sub-channels of UL OFDMA 204. In some embodiments, not all sub-channels may be used to receive communications. In some embodiments, some sub-channels may be used to receive more than one communication.

Stations may initiate the association process with the access point using UL OFDMA if they have not previously communicated with the access point, and have no identifier or scheduled communication slot assigned to them by the access point. Associating using UL OFDMA may allow the access point to provide an identifier such as an association ID and/or a scheduled communication slot to the station.

DL Ack 206 is a downlink acknowledgment signal. An access point may send acknowledgment signals to indicate it received communications on certain sub-channels in UL OFDMA 204. For example, the access point may receive a communication from a station on sub-channel 204a in UL OFDMA 204. The access point may send an acknowledgment using sub-channel 204a in DL Ack 206. In another example, the access point may receive no communication on sub-channel 204b. The access point may send no acknowledgment using sub-channel 204b in DL Ack 206. The acknowledgment may indicate that the access point received the communication sent in UL OFDMA 204. A station may wait a threshold amount of time to receive a DL Ack signal, and assume that no acknowledgement will be received if no DL Ack signal is received within the threshold amount of time.

DL SYNC 202, UL OFDMA 204, and DI, Ack 206 may together form a UL contention slot. The UL contention slot may be transmitted periodically to allow different stations to communicate with the access point. For example, a second UL contention slot, comprising DL SYNC 208, UL OFDMA 210, and DL Ack 212, may be transmitted after the first UL contention slot, comprising DL SYNC 202, UL OFDMA 204, and DL Ack 206.

Figure 3:
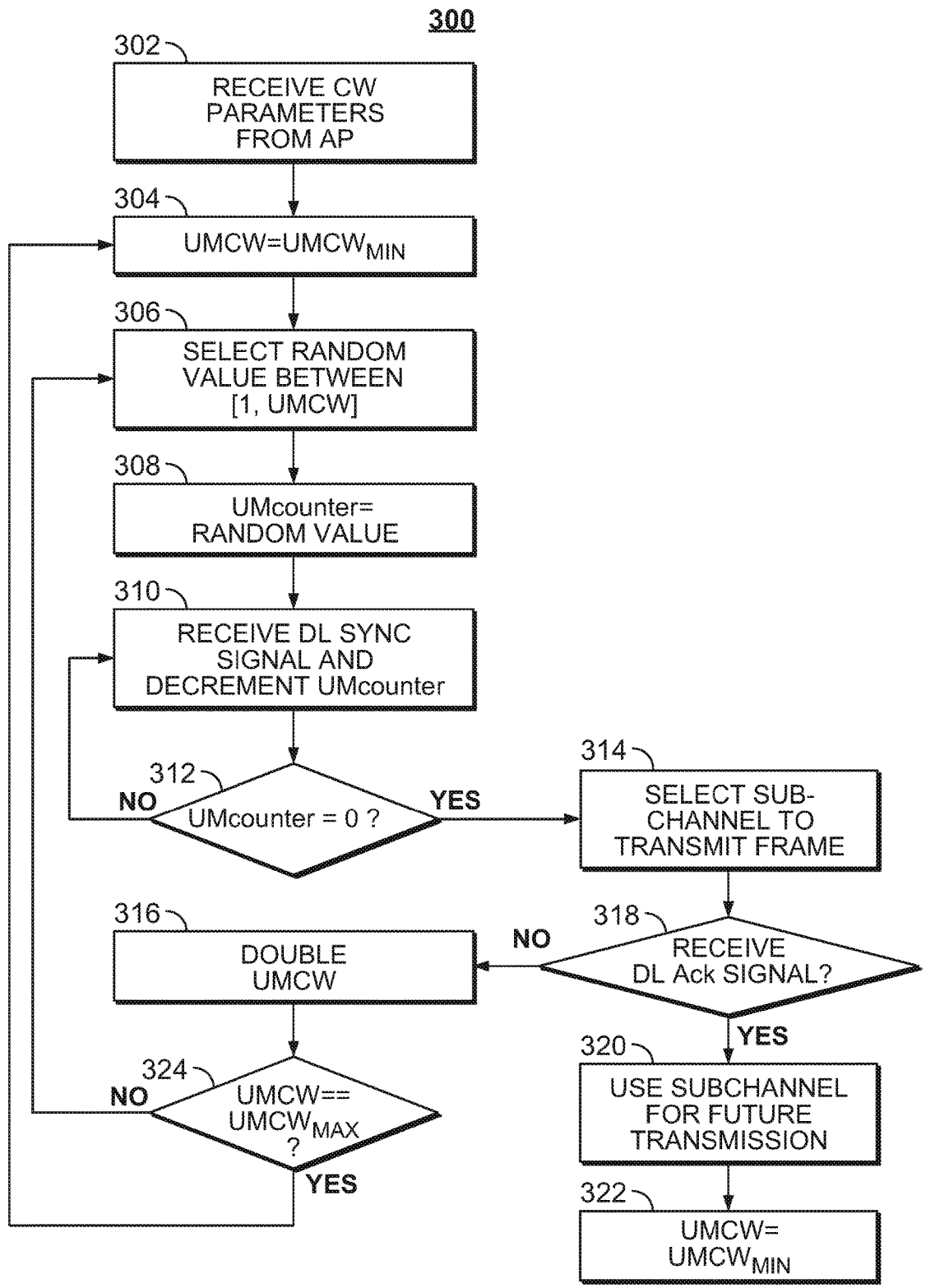
FIG. 3 shows an exemplary process for a station to participate in contention-based UL OFDMA, in accordance with some embodiments of the present disclosure.

FIG. 3 shows an exemplary process 300 for a station to participate in contention-based UL OFDMA, incorporating embodiments of the present disclosure. station may use process 300 to send a communication using a sub-channel in UL OFDMA 204 as described in relation to FIG. 2.

At block 302, the station receives parameter for contention-based OFDMA from the access point. The station may receive these parameters as part of a beacon frame or a management frame broadcast by an access point. The beacon frame or management frame may be broadcast periodically by an access point. The periodicity of beacon frame or management frame broadcasts may be the same as, or different from, the periodicity of UL contention slots. The received parameters may include a UMCWmin (UL OFDMA contention window minimum) value and a UMCWmax (UL OFDMA contention window maximum) value. These values may be used by the station to determine when to attempt communication with the access point. The UMCWmin value may not be larger than the UMCWmax value.

At block 304, the station sets its internal UMCW (UL OFDMA contention window) to UMCWmin. At block 306, the station selects a random value in the range between 1 and UMCW, inclusive. In some embodiments, the lower value bound for the range may be another number. In some embodiments, the station may use a deterministic algorithm to select a value in the range instead of selecting a random value. At block 308, the station sets its UMcounter (UL OFDMA counter) value to the selected random value from block 306.

At block 310, the station receives a DL SYNC signal and decrements UMcounter. For example, the station may receive DL SYNC 202. The station may decrement UMcounter by any natural number value. For example, the station may decrement the UMcounter value from to 14. At block 312, the station compares the updated UMcounter value to a threshold value. For example, the station may compare whether the UMcounter value is equal to zero. If UMcounter is equal to zero and the comparison is true, process 300 proceeds to block 314. If UMcounter is not equal to zero and the comparison is false, process 300 returns to block 310.

At block 314, the station selects a sub-channel to transmit a communication. The communication may be a management frame such as a resource request or an association request. In some embodiments, the station may randomly select a sub-channel that may match a random number generated by the station, the station's MAC address, a request ID for the communication to be transmitted by the station, or a frame's FCS (frame-check sequence) to a sub-channel.

In some embodiments, the station may select sub-channel using an algorithm. For example, the station may use the following algorithm:

$$n_{sub\text{-}channel} = (AID + random[0,11]) \% N_{channel}$$

wherein, $n_{sub\text{-}Channel}$ is an index of the selected sub-channel, AID is the association ID associated with the station, random represents the least significant 12 bits of the station's timer's value when DL SYNC 202 was received, or any 12-bit random value, and Nchannel is the total number of sub-channels to be used for UL OFDMA 204.

At block 318, the station determines whether DL Ack 206 has been received. The station may wait a threshold amount of time to receive DL Ack 206 before determining that DL Ack 206 has not been received. If the station receives DL Ack 206, process 300 may proceed to block 320. If the station does not receive DL Ack 206 within a threshold amount of time, process 300 may proceed to block 316.

At block 320, the station stores an indication of the sub-channel used to send a communication in UL OFDMA 204, and uses the same sub-channel for future communications with the access point. At block 322, the station resets the value of UMCW such that UMCW again equals UMCWmin. In some embodiments, block 3 may be optional. If block 3 is optional, the process 300 proceeds from block 318 to block 322 without storing an indication of the sub-channel.

At block 316, the station doubles the value of UMCW and stores this updated value as UMCW. At block 324, the station determines whether UMCW equals UMCWmax. If UMCW equals UMCWmax and the comparison is true, process 300 proceeds to block 304, and the UMCW is modified to equal UMCWmin. If UMCW does not equal UMCWmax and the comparison is false, process 300 proceeds to block 306, and the station selects a random value from the updated range between 1 and UMCW, inclusive.

Figure 4:
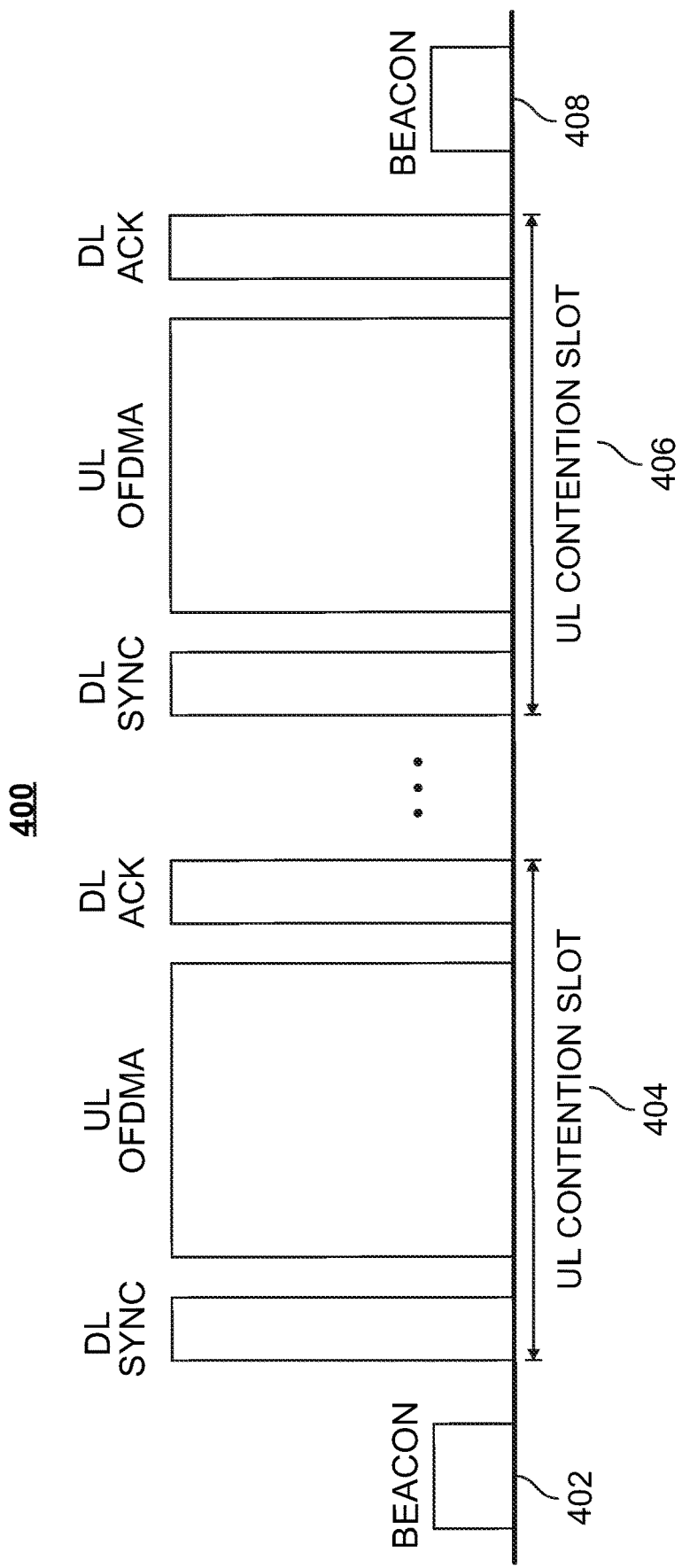
FIG. 4 shows an illustrative timeline for a contention-based UL OFDMA communication including beacon frames, in accordance with some embodiments of the present disclosure.

FIG. 4 shows an illustrative timeline 400 for a contention-based UL OFDMA communication including beacon frames, incorporating embodiments of the present disclosure. Timeline 400 includes beacon frames 402 and 408 that are transmitted periodically. Timeline 400 also includes UL contention slot 404 and UL contention slot 406, wherein each UL contention slot includes a DL SYNC, UL OFDMA, and DL Ack transmission as described in relation to FIG. 2.

In some embodiments, beacon frame 402 may be any other type of management frame. The access point may define parameters associated with UL contention slots 404 and 406, and transmit these parameters using beacon frame 402. The parameters transmitted in beacon frame 402 may apply to all UL contention slots transmitted until the next beacon frame 408 is transmitted. The time between the transmissions of beacon frame 402 and beacon frame 408 may be referred to as a beacon interval.

The parameters transmitted in beacon frame 402 may include a start time of a future UL contention slot 404. The parameters may also include a slot length of the UL contention slot 404. The parameters may also include the number of DL contention slots that will be transmitted before the next beacon frame 408. UL contention slots 404 and 406 may be transmitted as described in relation to FIG. 2.

In some embodiments, beacon 402 may only include parameters associated with the next UL contention slot 404. UL contention slot 404 may use DL E-Ack (downlink enhanced acknowledge) instead of DL Ack. DL E-Ack may include scheduling information associated with the next UL contention slot. The access point may take into account knowledge of the current number of stations and their requirements when creating the scheduling information associated with the next UL contention slot.

Figure 5:
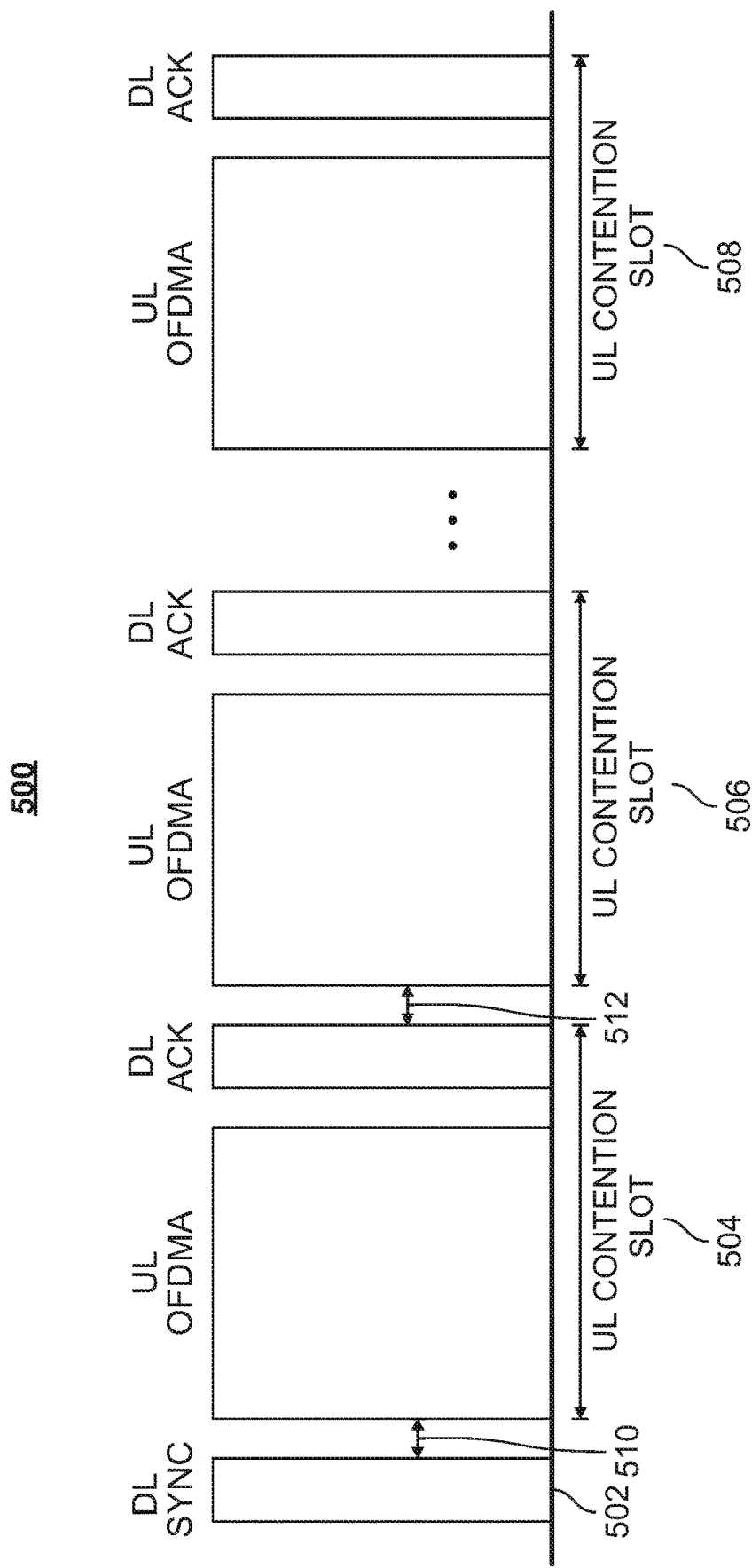
FIG. 5 shows an illustrative timeline for a contention-based UL OFDMA communication including multiple UL contention slots for each DL SYNC transmission, in accordance with some embodiments of the present disclosure.

FIG. 5 shows an illustrative timeline 500 for a contention-based UL OFDMA communication including multiple UL contention slots for each DL SYNC transmission, incorporating embodiments of the present disclosure.

Timeline 500 includes DL SYNC 502. DL SYNC 502 includes parameters about following UL contention slots 504, 506, and 508. Each UL contention slot 504, 506, and 508 may have the same duration and may include a UL OFDMA transmission and DL Ack transmission. DL SYNC 502 may include a parameter indicating the number of UL contention slots that follow before the next DL SYNC signal. DL SYNC 502 may include a parameter indicating the beginning of contention access with the next UL contention slot 504. DL SYNC 502 may be followed by any number of UL contention slots 504, 506, and 508.

DL SYNC 502 and UL contention slot 504 may be separated by inter-frame space 510. UL contention slot 504 and UL contention slot 506 may be separated by inter-frame space 512. Inter-frame spaces 510 and 512 may be used by the stations for idle/busy communication channel detection. Idle/busy communication channel detection may comprise monitoring a channel and determining that the channel is idle if no communication is detected on the channel or that the channel is busy if communication is detected on the channel. Idle/busy detection may also be performed on sub-channels within a channel. In some embodiments, inter-frame spaces 510 and 512 may be PCF (point coordination function) inter-frame spaces (PIFSs). Inter-frame spaces 510 and 512 may be PIFSs if the stations determine whether the communication channel is busy before using a slot to transmit a frame to the access point. In some embodiments, inter-frame spaces 510 and 512 may be short inter-frame spaces (SIFSs) if the stations use a PIFS duration before DL SYNC 502 to detect whether certain sub-channels used by DL SYNC 502 are idle or busy. The idle/busy result may be used by the stations to determine whether to transmit during UL contention slots 504, 506, and 508 that are indicated by DL SYNC 502.

In some embodiments, all stations may assume that each sub-channel on which DL SYNC 502 is transmitted by the access point is available for transmission during UL contention slots 504, 506, and 508. In this embodiment, inter-frame spaces 510 and 512 may be SIFSs.

Figure 6:
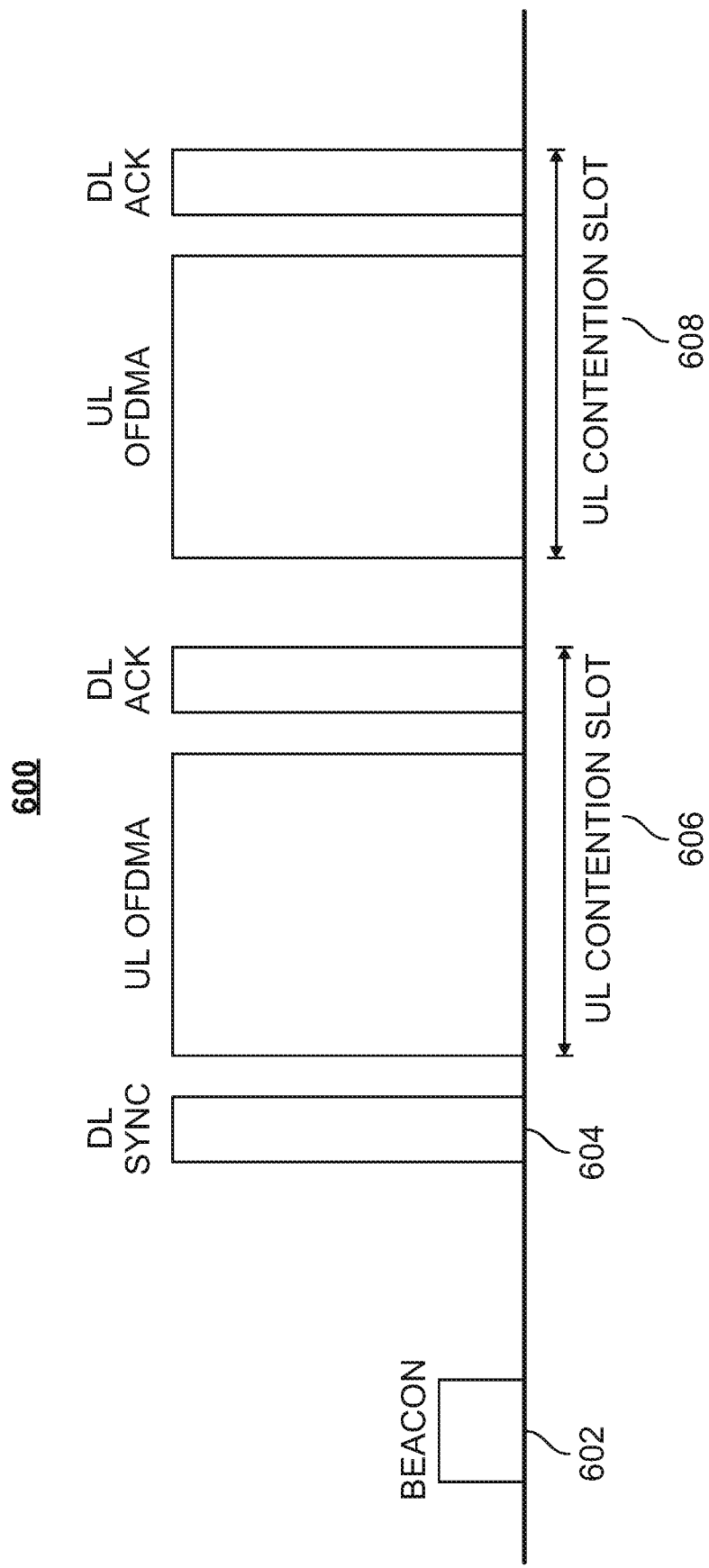
FIG. 6 shows an illustrative timeline for a contention-based UL OFDMA communication including a beacon frame and multiple UL contention slots for each DL SYNC transmission, in accordance with some embodiments of the present disclosure.

FIG. 6 shows an illustrative timeline 600 for a contention-based UL OFDMA communication including a beacon frame and multiple UL contention slots for each DL SYNC transmission, incorporating embodiments of the present disclosure. Beacon frame 602 may be similar to beacon frame 402. Timeline 600 may use one DL SYNC 604 with more than one UL contention slots 606 and 608, as described in relation to FIG. 5. Beacon frame 602 may include a parameter of the number of UL contention slots that follow beacon frame 602. Stations may store the number in a backoff counter, and decrement the backoff counter each time a UL contention slot is received. When the backoff counter reaches zero, the stations may stop expecting another UL contention slot transmission.

In some embodiments, a station may transmit short association request using the UL OFDMA frame in UL contention slot 606. The access point may send a pre-association identifier (pre-AID) to the station using an E-Ack in the DL Ack frame in UL contention slot 606. In some embodiments, each sub-channel may be associated with a unique pre-AID value. The station transmit a full association request to the access point in the UL OFDMA frame in UL contention slot 608. The full association request may include the station's pre-AID.

In some embodiments, the same pre-AID value may be assigned to multiple sub-channels. For example, if an access point determines that a number of AIDs unused by any station is less than the number of sub-channels available for contention, the access point may select an unused AID value to be used as the pre-AID value for multiple sub-channels. If the access receives multiple requests on sub-channels with the same pre-AID value, the access point may randomly select one sub-channel to send a DL Ack signal to avoid the same pre-AID value being assigned to multiple stations.

In some embodiments, a station may transmit fragmented association request. The station may split up an association request frame into many fragments, and transmit each fragment during a separate UL OFDMA slot. Alternatively, the station may transmit each fragment using a different sub-channel. In some embodiments, the station may use fragmentation if the length of time required to transmit the association request is longer than the UL OFDMA slot.

Figure 7:
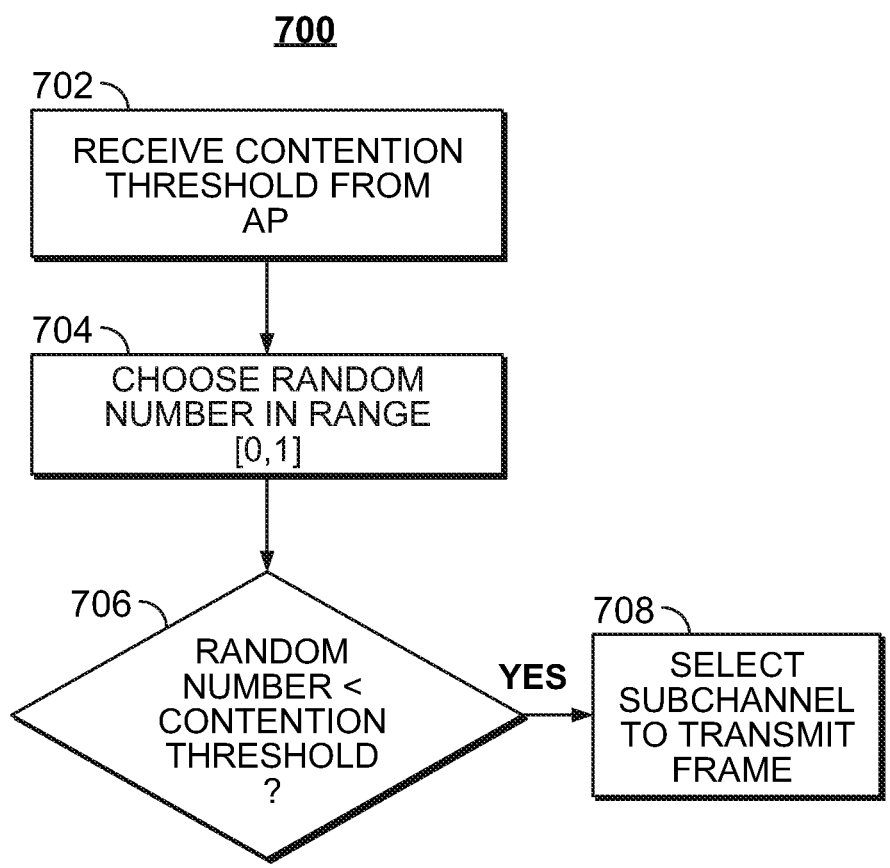
FIG. 7 shows an exemplary process for performing UL OFDMA contention based on a centralized indication, in accordance with some embodiments of the present disclosure.

FIG. 7 shows an exemplary process 700 for performing UL OFDMA contention based on a centralized indication, incorporating embodiments of the present disclosure. The centralized indication may allow an access point control over how often the stations perform contention-based accesses. Process 700 may be executed as a sub-process during the execution of process 300. Although process 700 is described using numerical ranges between 0 and 1, it is understood that any other numerical ranges may be used.

At block 702, a station receives a contention threshold value from an access point. Block 702 may be executed between blocks 312 and 314 in process 300. The station may receive the contention threshold value as a parameter in a beacon frame or a DL SYNC frame. In some embodiments, the contention threshold value may be a floating point value between 0 and 1, exclusive. The access point may create a high contention threshold value when the chance of stations' transmissions colliding during a UL OFDMA frame is high. The access point may create a low contention threshold value when the chance of stations' transmissions colliding during a UL OFDMA frame is low.

At block 702, the station may choose a random floating point number between 0 and 1, inclusive. At block 706, the station may compare the chosen random number to the contention threshold value. If the chosen random number is less than the contention threshold value, process 700 proceeds to block 708. At block 708, the station selects a sub-channel to transmit a frame during a UL OFDMA frame, as described relation to block 314.

Figure 8:
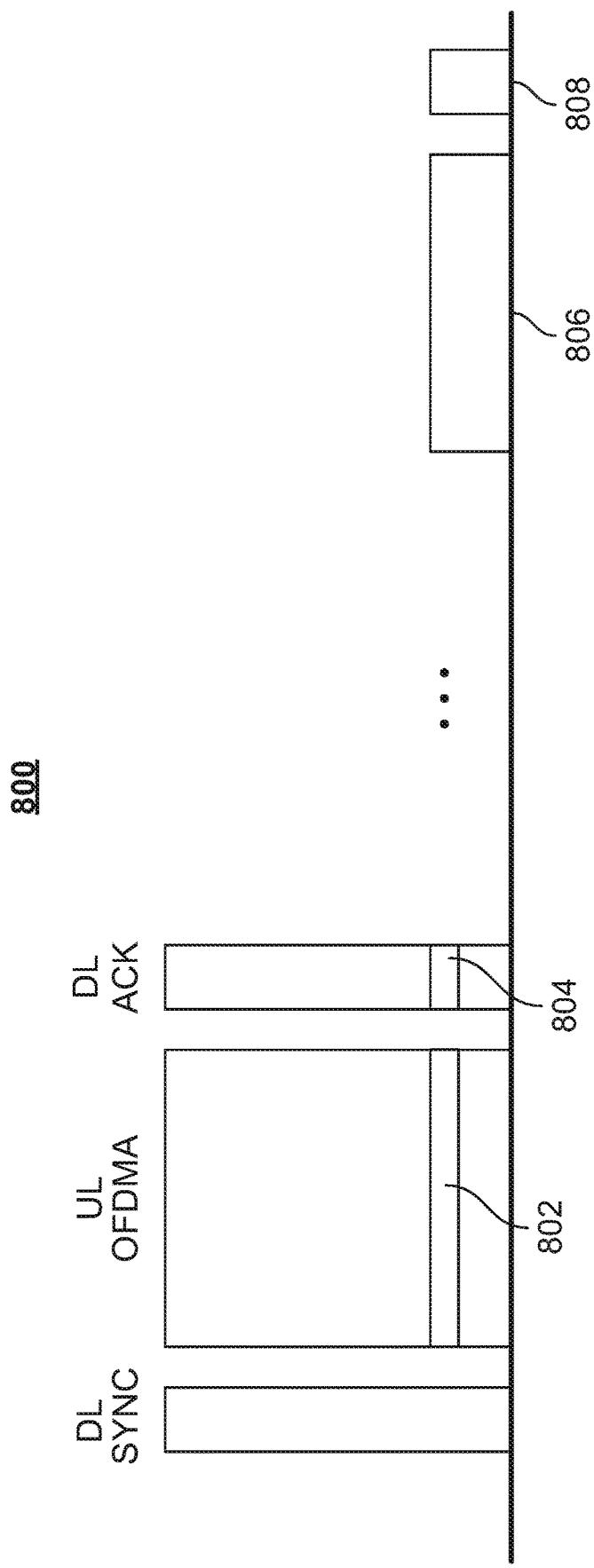
FIG. 8 shows an illustrative timeline describing how an access point can assign an association identifier to a station, in accordance with some embodiments of the present disclosure.

FIG. 8 shows an illustrative timeline 800 describing how an access point can may receive an association request through contention-based UL OFDMA and assign an association identifier (AID) to a station, incorporating embodiments of the present disclosure. An access point may use the AID to uniquely identify each station from which it has received an association request frame. A station may use its AID in every transmission to the access point to uniquely identify itself to the access point. The access point may also send an association response frame to the station through single user enhanced distributed channel access (EDCA) using a DL OFDMA slot.

A station may transmit an association request frame, or another request frame, to a station using sub-channel 802 in UL OFDMA. The station may be an unassociated station. That is, the station may not have successfully associated with the access point in the past. The access point may receive the request, and transmit an acknowledgment using sub-channel 804 in DL Ack.

The access point may assign an AID to each unassociated station that requests association with the access point using the UL OFDMA slot. In some embodiments, the access point may communicate individually with each unassociated station. In some embodiments, the access point may transmit an association response to the station with an AID for the station using association response frame 806. The station may acknowledge receipt of the association response frame using Ack 806. The access point may then repeat the process for other unassociated stations discovered using the UL OFDMA slot. The station may then include the AID in all future communication with the access point to identify itself.

In some embodiments, the access point may transmit a DL E-Ack signal using sub-channel 804. The E-Ack may include information about sleep and wake times for the station. The station may use the sleep and wake information to conserve power by sleeping until the wakeup time is reached, or the sleep time has expired. The access point may schedule the sleep time such that the station only wakes up when association response frame 806 is transmitted. The station may wakeup to receive association response frame 806, transmit Ack 808 to the access point, and go back to sleep to conserve power. A station may sleep by performing a reduced set of functions in comparison with normal functioning.

Figure 9:
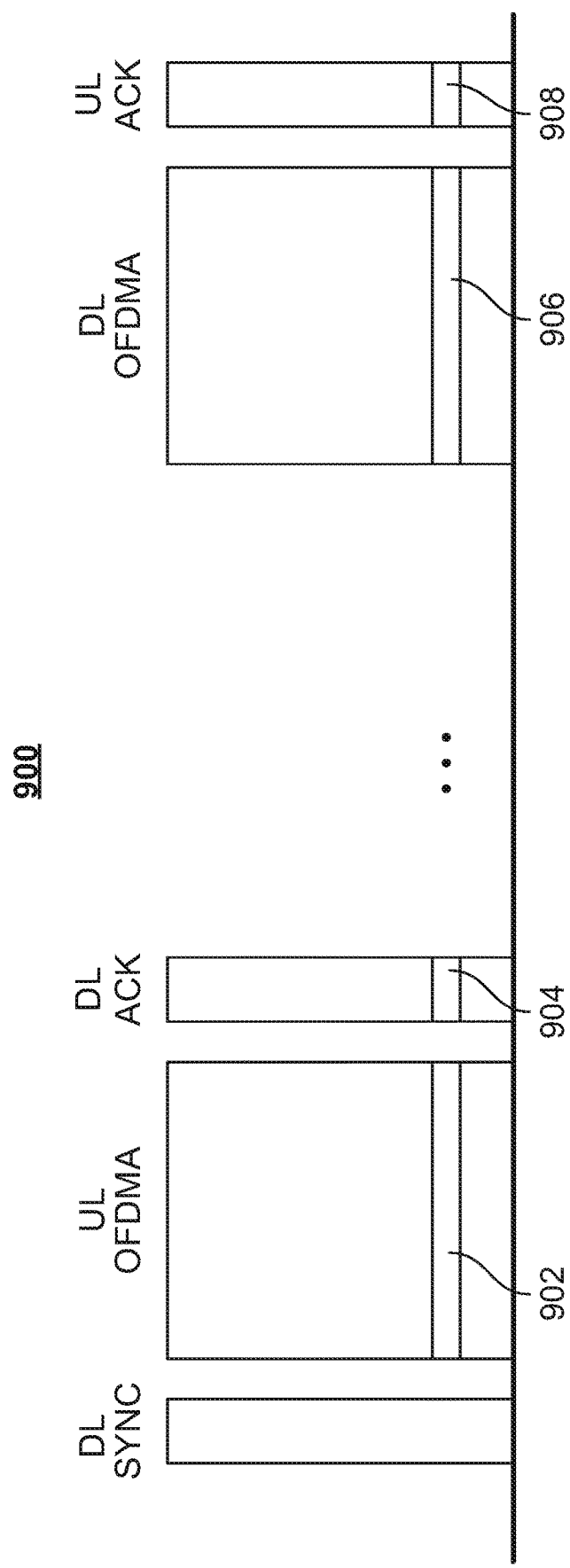
FIG. 9 shows an illustrative timeline describing how an access point can assign a pre-association identifier to a station using a UL OFDMA slot, in accordance with some embodiments of the present disclosure.

FIG. 9 shows an illustrative timeline 900 describing how an access point can assign a pre-association identifier to a station using a UL OFDMA 24 slot, incorporating embodiments of the present disclosure. A station may transmit an association request or another request frame to an access point using sub-channel 902 in UL OFDMA as described in relation to FIG. 8. The access point may respond with an E-Ack in sub-channel 904 of a DL Ack slot. The E-Ack may include a pre-association ID (pre-AID) allocated by the access point to the station. In some embodiments, the pre-AID may be a value not used as an AID by any associated station. The station may use the pre-AID in its communications with the access point until an AID is assigned to the station. The sub-channel corresponding to communications 902 and 904 may be the same. The station may continue monitoring the sub-channel corresponding to communications 902 and 904 for future transmissions from the access point.

A DL OLFMA frame may be transmitted after the DL Ack frame. The DL OFDMA frame may include association responses for all stations that were assigned a pre-AID in a previous UL OFDMA frame. For example, the access point may transmit an association response using sub-channel 906 to the station that transmitted an association request using sub-channel 906. In some embodiments, sub-channels 902, 904, and 906 are the same. In some embodiments, the association response includes an updated AID for the station. In some embodiments, the association response includes an indication that the station should use its pre-AID as its AID. The stations that received an association response during DL OFDMA may transmit an acknowledgment frame to the access point. For example, a station that received an association response using sub-channel 906 may transmit an acknowledgment frame using sub-channel 908 during a UL Ack frame. In some embodiments, sub-channel 906 and 908 may be the same. In some embodiments, the UL Ack from the stations to the access point may include each station's respective AID.

In some embodiments, the access point may send the pre-AID using a multi-STA block acknowledge (BA) frame instead of an E-Ack frame. The BA frame may be used if the sub-channel received an aggregated frame using an Aggregated MAC Protocol Data Unit (A-MPDU) or a High-Efficiency MAC Protocol Data Unit (HE single MPDU). The pre-AID may be stored in the BA/Ack Information field of the BA frame. The BA frame with the pre-AID for a station may be transmitted on the sub-channel the station used to transmit its request during the UL OFDMA frame. If no request was received on a particular sub-channel, a negative BA/Ack may be transmitted on that sub-channel. A negative BA/Ack may have its pre-AID field set to zero.

The BA frame may have the following structure. In some embodiments, the BA frame may include the following fields: "Frame Control," "Duration/ID," "RA," "TA, "BA Control," "BA/Ack Information," and "FCS." The "Frame Control," "Duration/ID," "RA," and "TA" fields together may comprise a MAC header. In some embodiments, the "BA Control" field may include the following fields: "BA Ack Policy," "Multi-TID," "Compressed Bitmap," "GCR," "Reserved," and "TID INFO." In some embodiments, the "BA/Ack Information" field may include the following fields: "Per AID Info," "Block Ack Starting Sequence Control," and "Block Ack Bitmap." Fields "Block Ack Starting Sequence Control" and "Block Ack Bitmap" may be optional. In some embodiments, the "Per AID Info" field may include the following fields: "AID," "BA/Ack Indication," and "TID." The AID, pre-AID, and pre-partial AID (pre-PAID) information may be stored in the "AID" field of the "Per AID Info" field of the "BA/Ack Information" field. The BA/Ack Information field may include only one AID, and may be repeated for each AID transmitted.

Figure 10:
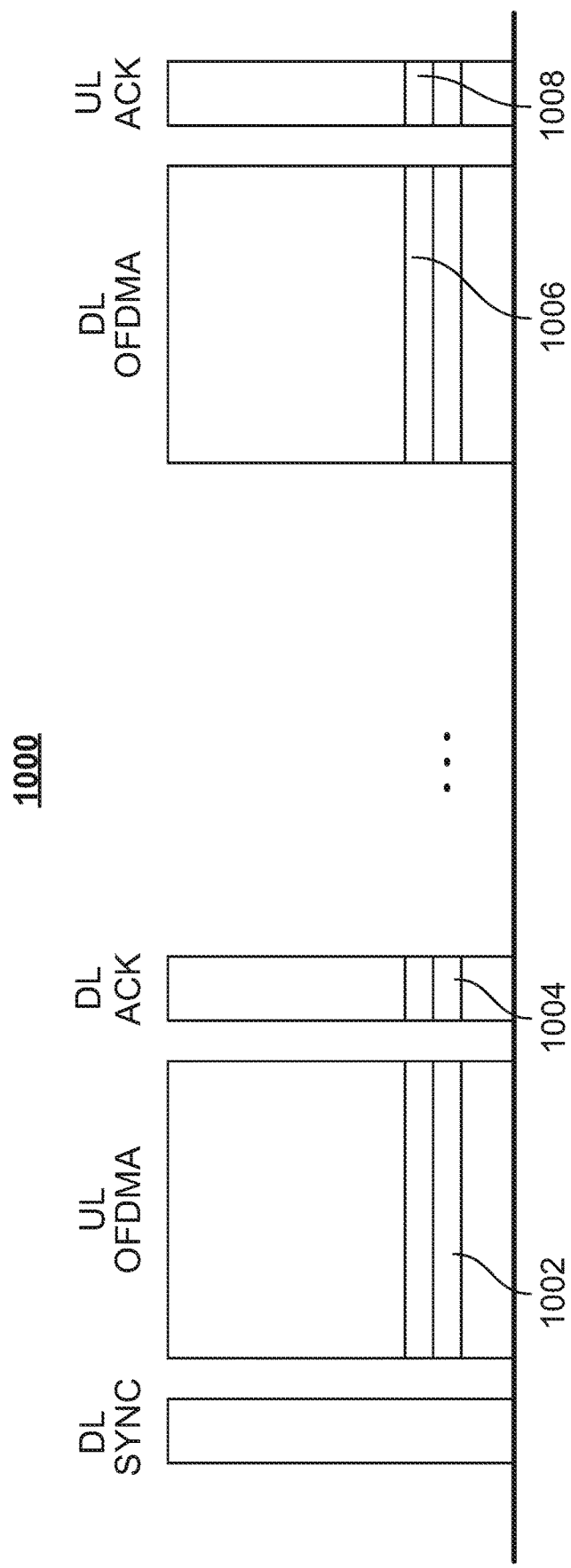
FIG. 10 shows an illustrative timeline describing how an access point can assign a pre-association identifier to a station using multiple sub-channels, in accordance with some embodiments of the present disclosure.

FIG. 10 shows an illustrative timeline 1000 describing how an access point can assign a pre-association identifier to a station using multiple sub-channels, incorporating embodiments of the present disclosure. DL SYNC in timeline 900 may include a pre-AID value for each sub-channel used by DL SYNC. The pre-AID value may be similar to pre-AID values described in relation to FIG. 9.

A station may select sub-channel 1002 to transmit an association request to an access point. The station may retrieve the pre-AID transmitted in the corresponding sub-channel in DL SYNC. The station may receive an acknowledgment frame in sub-channel 1004 in DL Ack. In some embodiments, the DL Ack frame may include an E-Ack. The station may then use the retrieved pre-AID as its pre-AID value. For example, if DL SYNC included the pre-AID value "10" corresponding to sub-channel 1002 used by a station to transmit an association request, the station may use "10" as its pre-AID after receiving an acknowledgment frame in sub-channel 1004 of DL Ack. In some embodiments, sub-channels 1002 and 1004 may be the same.

The station may determine its pre-AID value corresponds to a certain sub-channel of DL OFDMA. For example, the station with pre-AID value "10" determine that its DL OFDMA sub-channel is sub-channel 1006. The station may monitor sub-channel 1006 to receive an association response from the access point. The association response may include similar information as the association response discussed in relation to FIG. 9. In some embodiments, channel 1006 may not be the same as channels 1002 and 1004. The station may transmit an acknowledgment to the access point using sub-channel 1008 in the UL Ack frame. In some embodiments, sub-channels 1006 and 1008 may be the same.

In some embodiments, multiple stations may try to use the same sub-channel in a UL OFDMA frame. The multiple stations may all assume they own the pre-AID value associated with the sub-channel. The DL OFDMA frame may be used to confirm which station actually received the pre-AID value. For example, station A and station B may both transmit association requests using sub-channel 1002. Station A and station B may both store the pre-AID value associated with sub-channel 1002 as their own pre-AID value. The access point may only receive the association request from station A due to its higher power.

Stations A and B may both monitor channel 1006 associated with their pre-AID value for an association response in the DL OFDMA frame. The access point may transmit an association response with the MAC address (or some other similar unique identifier) of station A. Station B may delete its pre-AID value. Station A may determine that its association request was responded to by the access point, and transmit an acknowledgment frame in sub-channel 1008 in the UL Ack frame. In some embodiments, the DL Ack frame include the MAC address of the station whose association request was received by the access point.

In some embodiments, if enough pre-AIDs to uniquely assign pre-AIDs to channels and stations are not available, the access point may assign the same pre-AID to multiple sub-channels. The access point may then select a single sub-channel of the multiple sub-channels with the same pre-AID value to send an acknowledgment frame to. The access point may hence avoid pre-AID collisions between data sent by different stations by picking one station to assign the shared pre-AID value to.

In some embodiments, a station may transmit power save poll (PS-Poll) frame using sub-channel 1002 in UL OFDMA to indicate to the access point that it has woken up from a power-saving sleep mode. In some embodiments, the access point sends a DL Ack to the station to acknowledge receipt of the PS-Poll frame, and then sends a frame to the station using sub-channel 1006 in DL OFDMA. In some embodiments, the access point sends a DL E-Ack to the station to acknowledge receipt of the PS-Poll frame, instructing it to sleep until the next DL OFDMA frame. The station may then wake up in time to receive a frame from the access point using sub-channel 1006 in the DL OFDMA frame. In some embodiments, the E-Ack frame may also include an indication of whether the access point has data to transmit to the station. If the E-Ack frame indicates that the access point has no data to transmit to the station, the station may not wake up when the next DL OFDMA frame is transmitted.

Figure 11:
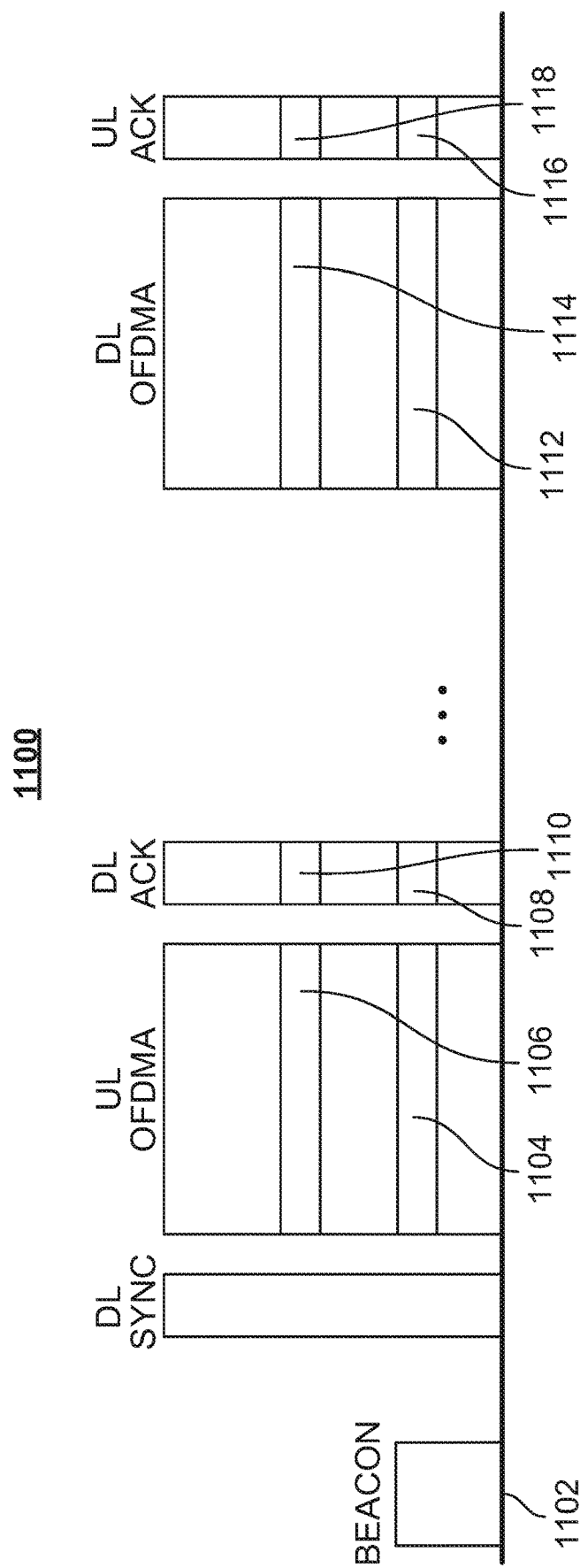
FIG. 11 shows an illustrative timeline describing how an access point can assign association identifiers to multiple stations using multiple sub-channels, in accordance with some embodiments of the present disclosure.

FIG. 11 shows an illustrative timeline 1100 describing how an access point can assign identifiers to multiple stations using multiple sub-channels, incorporating embodiments of the present disclosure. In some embodiments, the stations may set their sleep and wake times based on information received about the timing of UL contention slot broadcasts received from beacon frame 1102. The stations may sleep unless a UL contention slot is going to be received soon, and then transmit a PS-Poll frame or an association request frame to the access point using UL OFDMA 1106.

Beacon frame 1102 may include information about a start time of a future DL contention slot. Stations A and B may sleep until the future UL contention slot is to be broadcasted. Stations A and B then may awaken in time to receive a DL SYNC signal indicating the beginning of a UL contention slot. Station A may use sub-channel 1104 to transmit a PS-Poll frame to the access point. Station B may use sub-channel 1106 to transmit a PS-Poll frame to the access point.

The access point may transmit E-Ack frames back to the stations instead of a DL Ack frame. The access point may transmit an E-Ack frame to station A using sub-channel 1108 and an E-Ack frame to station B using sub-channel 1110. In some embodiments, the E-Ack frames may include the unique identifier (such as a pre-AID) assigned to the station by the access point. If multiple frames were received in the same sub-channel, the access point may only transmit the unique identifier of the station with the strongest association request frame signal in the E-Ack frame. In some embodiments, the access point may send a special E-Ack indicating no frame was received on every sub-channel in the DL Ack frame that did not receive a frame in the corresponding sub-channel in the UL OFDMA frame. In some embodiments, a station may sleep until a DL OFDMA frame is to be received. In some embodiments, one or both stations may include a unique identifier in the PS-Poll request after they wake from their sleep. The unique identifier may include a request ID, a random number, a portion of the station's MAC address, or a part of the frame check sequence (FCS) of the frame sent by the station.

The access point may transmit a frame to station A using sub-channel 1112 and a frame to station B using sub-channel 1114 in a DL OFDMA frame. Station A may transmit an acknowledgment frame using sub-channel 1116 and station B may transmit an acknowledgment frame using sub-channel 1118 in the UL Ack frame.

Figure 12:
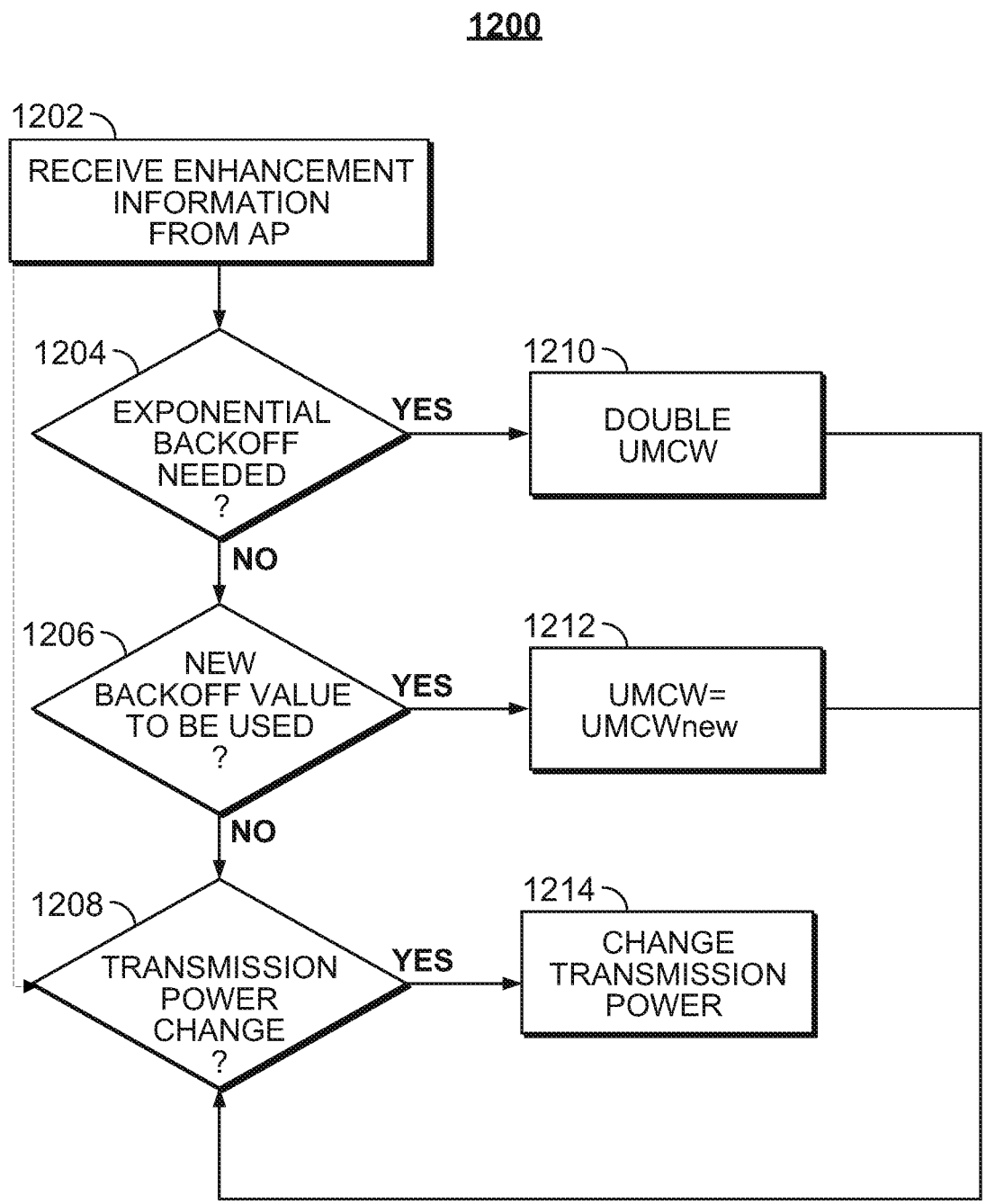
FIG. 12 shows an exemplary process for performing UL OFDMA contention based on enhanced access, in accordance with some embodiments of the present disclosure.

FIG. 12 shows an exemplary process 1200 for performing UL OFDMA contention based on enhanced access, incorporating embodiments of the present disclosure. In some embodiments, enhanced access may be used in situations where the number of sub-channels is more than the number of stations. In this situation, exponentially doubling a UMCW value in process 300 may be an aggressive strategy since collisions between frames are not rare but idle sub-channels still exist. A less aggressive strategy may result in a more efficient process by letting the access point indicate whether exponential backoff is necessary. Process 1200 may be executed as a sub-process of process 300. in some embodiments, process 1200 may be executed to optimize usage of resources other than sub-channels.

An access point may collect statistics about numbers of collisions, idle sub-channels, and busy sub-channels after each UL OFDMA frame. The access point may also change the number of sub-channels available for UL OFDMA frames. The access point may use the next DL SYNC or beacon frame to transmit enhancement information based on the analysis. At block 1202, a station may receive this enhancement information from the access point.

At block 1204, the station determines, using the enhancement information, whether exponential backoff is needed. If the enhancement information indicates exponential backoff is needed, process 1200 proceeds to block 1210, when the station doubles its UMCW value as described in relation to block 316. While doubling is discussed in this embodiment, it is understood that exponential backoff may comprise multiplying the UMCW value by any other number as well. Block 1204 may be executed between blocks 318 and 316.

If the enhancement information indicates that exponential backoff is not needed at block 1204, process 1200 proceeds to block 1206. At block 1206, the station determines, using the enhancement information, whether a new backoff value is to be used. if the enhancement information indicates a new backoff value is to be used, process 1200 proceeds to block 1212 and the station sets its UMCW value to equal the new backoff value UMCWnew.

If the enhancement information indicates that a new backoff value is not needed at block 1206, process 1200 proceeds to block 1208. In some embodiments, after blocks 12 and 1212 have been executed, process 1200 may proceed to block 1208. in some embodiments, process 1200 may proceed to block 1208 from block 1202, and blocks 1204, 1206, 1210, and 1212 may be optional. This is shown by the dashed line from block 1202 to block 1208 in FIG. 12. At block 1208, the station determines whether to change its transmission power, or change any other parameters regarding its transmissions.

In some embodiments, the station may receive feedback from the access point in the DL Ack frame about the transmission received from the station in a UL OFDMA frame. The feedback may include information such as whether the frame was detected, correctly received, and/or correctly decoded. The feedback may also include information that energy was detected but the frame could not be received and/or decoded because of a weak signal. The feedback may also include information that strong energy was detected but the frame could not be received and/or decided because of collision. In some embodiments, the station may use the feedback information to determine whether to change its transmission power. In some embodiments, the station may also use the feedback information to determine whether to change its UMCW value.

If the station determines that its transmission power needs to be changed, process 1200 proceeds to block 1214 and the station changes its transmission power. Changing the transmission power may comprise both increasing and decreasing the transmission power. If the station determines that its transmission power does not need to be changed, process 1200 is ended.

Figure 13:
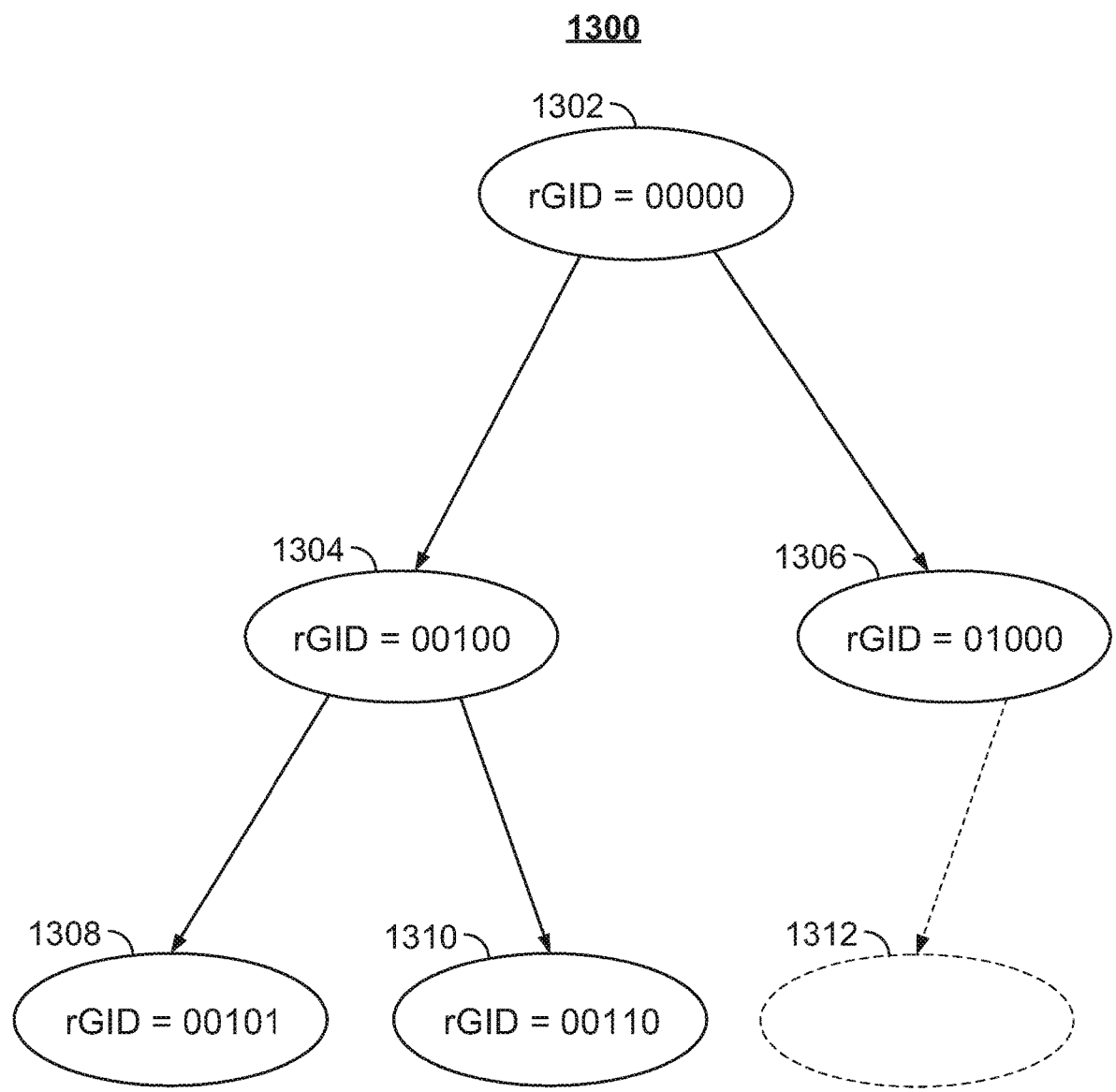
FIG. 13 shows an illustrative graph indicating how stations and access points may be assigned to different groups to improve efficiency, in accordance with some embodiments of the present disclosure.

FIG. 13 shows an illustrative graph 1300 indicating how stations and access points may be assigned to different groups to improve efficiency, incorporating embodiments of the present disclosure. As referred to herein, efficiency may be a measure of how many transmissions, from a station to an access point, are successful. In some embodiments, a successful transmission may be any transmission that is not transmitted at the same time and using the same sub-channel as any other transmissions. That is, a successful transmission does not collide with any other transmission. In some embodiments, traditional UL OFDMA may be inefficient because the number of stations being less than the number of sub-channels results in a high number of collisions and some idle sub-channels, while the number of stations being less than or equal to the number of sub-channels results in a high number of idle sub-channels and some collisions. In some embodiments, efficiency may be increased if a limited number of stations compete for access to each sub-channel. In some embodiments, efficiency may be improved if stations are grouped such that each group of stations competes for a given sub-channel, and each group is of a limited size. In some embodiments, the access point may indicate which group each station belongs to.

In some embodiments, stations may be assigned to groups based on their access categories. Stations of a higher access category than others may be given priority, and thus a group number to facilitate easier access to the access point. Each group may be allocated a different number of sub-channels. In some embodiments, different groups may be associated with different lengths of UL OFDMA frames. In some embodiments, stations may be assigned a set of group identification numbers (rGIDs) after their association with the access point. For example, an access point may transmit an rGID value to a station in an E-Ack frame. In some embodiments, stations may be assigned rGID using a beacon frame or a trigger frame allowing random access (TF-R frame).

The size of a group may refer to the number of stations assigned that are that rGID. If the group has size 1, each station has a unique rGID. The access point may limit each group to have a size less than a maximum size. The access point may change the rGID assigned to a station to maintain the size of each group. In some embodiments, if most stations with the same rGID have succeeded in communicating with the access point using a sub-channel, the access point may change the rGID assigned to the successful stations using that sub-channel. This may allow the sub-channel to be used more freely by unassociated stations. In some embodiments, if several unassociated stations are using a sub-channel to contend for access to the access point, the access point may change the rGID of associated stations using that sub-channel. In some embodiments, a station may be assigned more than one group, or no group.

In some embodiments, an access point may assign stations to groups based on when each group is scheduled to transmit data to the access point. For example, stations that require frequent communication with the access point may be assigned to groups scheduled to perform frequent communications with the access point. In some embodiments, an access point may assign stations to groups based on the number of sub-channels assigned to the group. For example, a station may be more likely to be assigned to a group assigned four sub-channels than to a group assigned one sub-channel. In some embodiments, an access point may assign stations to groups based on the length of the UT, OFDMA slot associated with each group. For example, if a station transmits short association requests, it may be assigned to a group with a short UL OFDMA slot than to a station with a long UL OFDMA slot.

In some embodiments, the access point may broadcast a DL SYNC frame indicating which rGIDs should contend for random access to the access point. If a station determines its rGID is included in the DL SYNC frame, it will contend for the sub-channel assigned to its rGID. Otherwise, it will wait for a new DL SYNC frame. If a previous rGID including the station is not the same as a current rGID including the station, the station may reset its UMCW value and backoff procedure and wait for a new DL SYNC frame.

Graph 1300 may be a data structure used by an access point to assign rGIDs to stations. Any other data structure may be similarly used without departing from the scope of the disclosure. Graph 1300 includes many nodes (1302, 1304, 1306, 1308, and 1310) connected uni-directionally to create a tree structure. Graph 1300 may allow the access point to assign multiple rGIDs and balance the load on each sub-channel. Graph 1300 uses prefix coding to create rGID values. The stations within the same leaf groups have the same rGID. For example, if two stations belong to leaf group 1308, they will both have the rGID "00101". The stations within the same parent group have the same prefix for their rGID. For example, leaf groups 1308 and 1310 both share the rGID prefix "001" with their parent group 1304.

In some embodiments, the access point may balance the load on parent nodes 1304 and 1306 by ensuring a similar number of leaf nodes is assigned to each parent node. For example, the access point may determine parent node 1304 is associated with two leaf nodes, and create a leaf node 1312 associated with parent node 1306 to balance the load. Stations with different rGIDs may communicate using different sub-channels.

Figure 14:
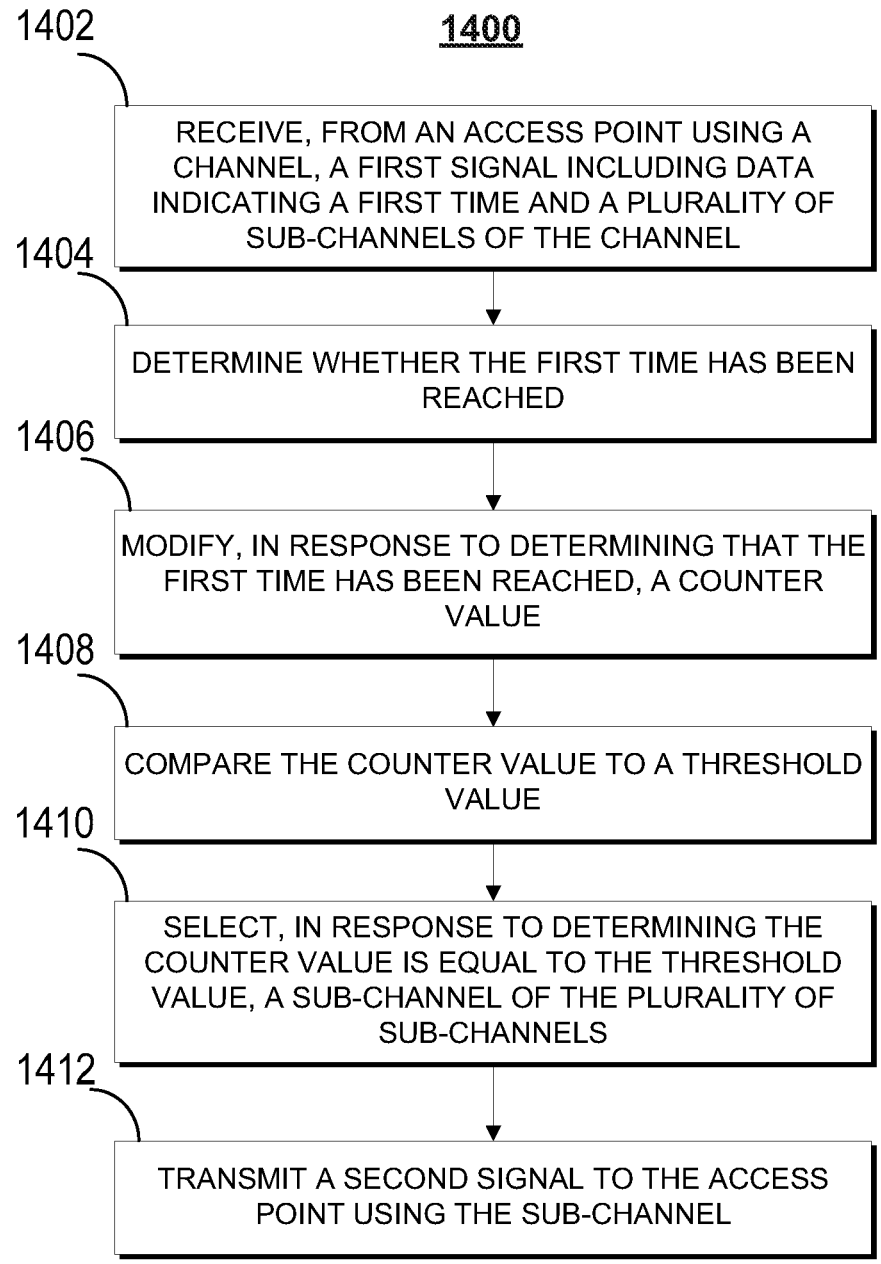
FIG. 14 shows an exemplary process for a network to perform contention-based UL OFDMA, in accordance with some embodiments of the present disclosure.

FIG. 14 shows an exemplary process 1400 for a network to perform contention-based UL OFDMA, in accordance with some embodiments of the present disclosure. Process 1400 may be performed by control circuitry of any station as described in relation to FIG. 1. While process 1400 is discussed in relation to one station and access point, it is understood that any number of stations and access points may be used.

At block 1402, a station may receive, from an access point using a channel, a first signal including data indicating a first time and a plurality of sub-channels of the channel. In some embodiments, the first signal may be a DL SYNC signal. In some embodiments, the station may be an unassociated signal. In some embodiments, the first time may be a time that the channel will have a UL OFDMA slot.

At block 1404, the station may determine whether the first time has been reached. The station may compare a time provided by an internal clock or time counter to the first time received from the access point to determine whether the first time has been reached. The station may determine that the first time has been reached if the time provided by the internal clock or time counter is greater than or equal to the first time.

At block 1406, the station may modify, in response to determining that the first time has been reached, a counter value. The station may retrieve the counter value from its internal storage using its control circuitry. The station may modify the counter value by changing its value. For example, the station may decrement the counter value by 1. In some embodiments, the counter value may be the UMcounter value as described in relation to FIG. 3.

At block 1408, the station may compare, using its control circuitry, the counter value to a threshold value. If the threshold value is 0, this may be similar to block 312. The station may perform the comparison to determine whether the counter value is equal to the threshold value.

At block 1410, the station may select, in response to determining the counter value is equal to the threshold value, a sub-channel of the plurality of sub-channels. The station may select the sub-channel by using a pseudo-random selection process as described in relation to block 314.

At block 1412, the station may transmit second signal to the access point using the sub-channel. The second signal may be an association request transmitted during a UL OFDMA slot. The station may later receive a DL Ack or DL E-Ack frame to from the access point acknowledge its transmission.

In some embodiment channel or sub-channel contention techniques described above, and in a commonly owned U.S. patent application Ser. No. 14/960,151, filed Dec. 4, 2016, which is herein incorporated by reference in its entirety, may be further improved by using stations that may perform physical (PHY) or virtual carrier sensing to determine if a relevant channel or sub channel is idle or busy. Such carrier sensing techniques may help avoid collisions and reduce the number of failed transmission attempts.

Figure 15:
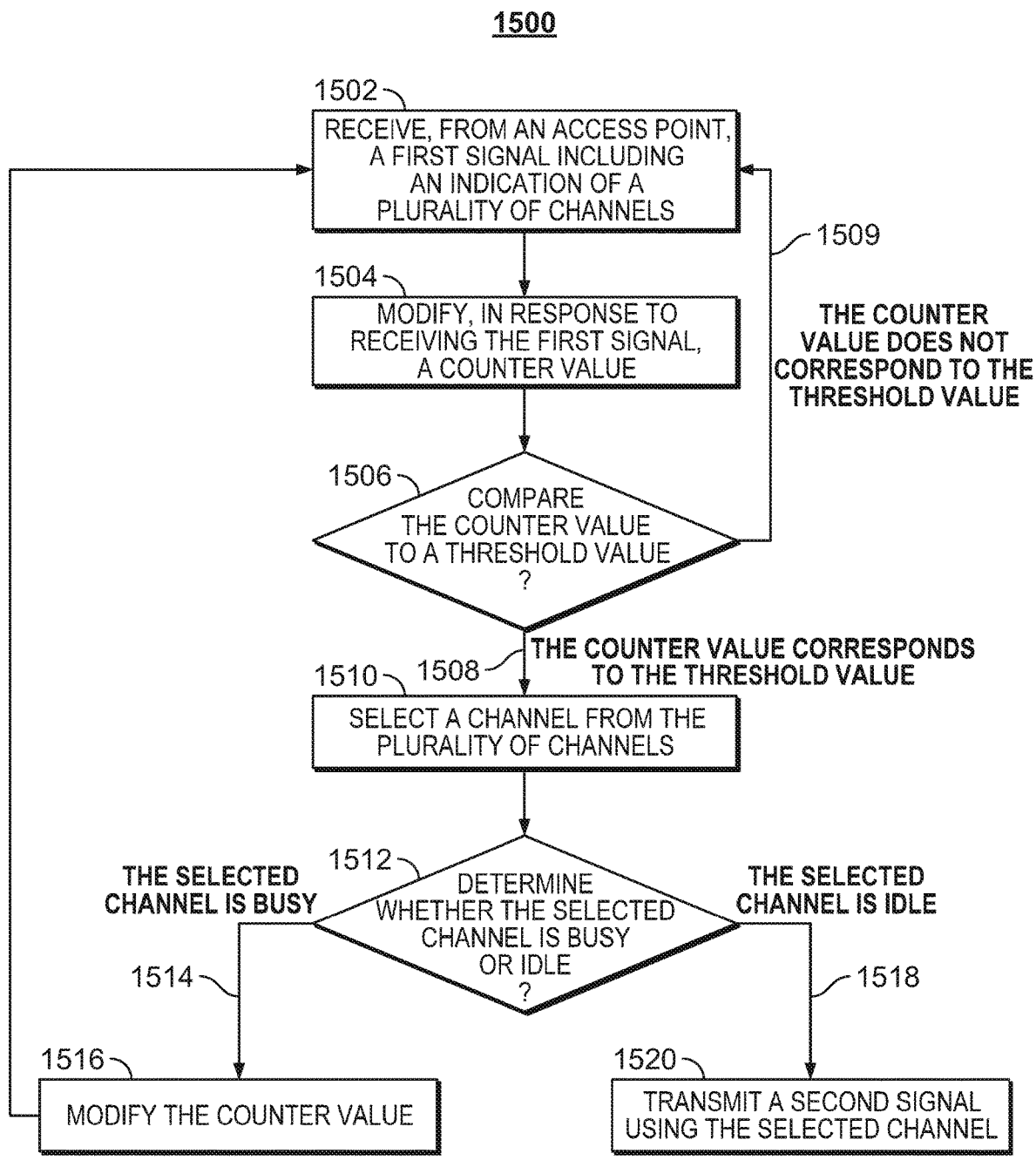
FIG. 15 shows an exemplary process for a network to perform contention-based UL OFDMA with carrier sensing, in accordance with some embodiments of the present disclosure.

FIG. 15 shows an exemplary process 1500 for a network to perform contention-based UL OFDMA utilizing carrier sensing capability of a station (e.g., STA 106, STA 108, STA 110, STA 112, STA 114 of FIG. 1), in accordance with some embodiments of the present disclosure. Process 1500 may be performed by control circuitry of any station as described in relation to FIG. 1. While process 1500 is discussed in relation to one station and access point, it is understood that any number of stations and access points may be used.

At block 1502, a station may receive, from an access point (e.g., AP 102 of FIG. 1), a first signal including data indicating a plurality of channels. In some embodiments, the plurality of channels may include sub-channels of the same channel.

In some embodiments, the first signal may be a trigger frame (such as a DL SYNC signal, described e.g., in relation to FIG. 10). In some embodiments, the trigger frame may include a carrier sensing CS flag, indicating whether or not the station should perform carrier sensing. In some embodiments, steps 1504-1520 will be performed only if the CS flag indicates that carrier sensing should be performed by the station.

At block 1504, the station may modify, in response to receiving the first signal, a counter value. In some embodiments, the counter value may be a backoff counter value (such as a UMcounter value described e.g., in relation to FIG. 3). The station may retrieve the counter value from its internal storage using its control circuitry. In some embodiments, the backoff counter value may be reduced by the number of channels indicated by the first signal in block 1502. For example, if the first signal indicated three channels, the backoff counter value may be reduced by "3." That is, if the counter value was "15" it may be changed to "12."

In some embodiments, the station may modify, in response to receiving the first signal, a counter value reduced by "1." For example, the station may decrement the backoff counter value from "15" to "14." In some embodiments, the station may decrement the counter value by any other amount. In some embodiments, the station may modify the counter value in any other way.

At block 1506, the station may compare, using its control circuitry, the counter value to a threshold value. If the threshold value is "0," this may be done similarly to block 312 of FIG. 3. In some embodiments, the threshold value may be any other integer or non-integer value. The station may perform the comparison to determine whether the counter value corresponds to the threshold value. For example, the station may determine whether the counter value equals the threshold value, or whether the counter value is sufficiently close the threshold value.

If the station determines 1508 that counter value corresponds to the threshold value, the station may proceed to perform the actions of block 1510. If the station determines 1509 that counter value does not correspond to the threshold value, the station may, for example, proceed to block 1502 to perform the process 1500 again when a new signal (e.g., a new trigger frame) is received from the access point. In some embodiments, if the station determines that counter value does not corresponds to the threshold value, the station may proceed to block 1504 after some predetermined amount of time has passed.

At block 1510, the station may select, in response to determining the counter value corresponds to the threshold value, a channel from the plurality of channels. For example, the station may select the channel by using a pseudo-random selection process as described in relation to block 314. In some embodiments, the station may select the channel by using any other random, pseudorandom, or deterministic process.

At block 1512, the station may determine whether the selected channel is busy or idle. In some embodiments, the station may determine whether the selected channel is busy or idle by performing PHY carrier sensing or virtual carrier sensing on the selected channel, or by performing any combination thereof. In some embodiments, PHY carrier sensing and virtual carrier sensing may be performed as described in relation to FIG. 1.

If the station determines 1514 that the selected channel is busy, the station may proceed to block 1516. If the station determines 1518 that the selected channel is idle, the station may proceed to block 1520.

At block 1520, the station may, in response to determining that the he selected channel is idle, transmit a second signal using the selected channel. In some embodiments, the station may transmit the second signal to the access point. In some embodiments, the second signal may be an "uplink" or "UL" signal as described in in relation to FIG. 2.

At block 1516, the station may, in response to determining that the he selected channel is busy, further modify the counter value.

In some embodiments, the station may modify the counter value by resetting the counter value to the value it had prior to modifications at block 1504. For example, if the counter value was equal to "15" at block 1502, and was modified to "12" at block 1504, the station may reset the counter value to "15."

In some embodiments, the station may modify the counter value by selecting a new value from a range of values associated with the counter value. For example, if the counter value is UMcounter value described in relation to FIG. 3, a new counter value may be randomly selected between the value of "1" and UMCW value, as described, for example in relation to block 306 of FIG. 3. In some embodiments, the station may select a new value from any other kind of a range of values associated with the counter value. In some embodiments, the station may select a new value from the range of values using any kind of random, pseudorandom, or deterministic technique. For example, the station may randomly select an integer value from a range of 1 to 15.

In some embodiments, the station may modify, in response to determining that the selected channel is busy, the range of values associated with the counter value. In some embodiments, the station may increase the range of values associated with the counter value. For example, the range of values may be doubled. That is, if the range of values associated with the counter value was 1 to 15, the range may be expanded to 1 to 30. In some embodiments, the range of values associated with the counter value may be determined by the UMCW value as described in relation to FIG. 3. In such cases, the UMCW may be doubled as described, for example in relation to block 316 of FIG. 3. In some embodiments, the range of values associated with the counter value may be modified in any other manner.

In some embodiments, after the range of values associated with the counter value is modified, the station may select a new counter value from the modified range of values. In some embodiments, the station may select a new value from the modified range of values using any kind of random, pseudorandom, or deterministic technique. For example, the station may randomly select an integer value from a range of 1 to 30.

In some embodiments, after the station modifies the backoff counter at block 1516, the station may proceed back to block 1502, and repeat the process 1500 when a new signal (e.g., a new trigger frame) is received from the access point. In some embodiments, after the station modifies the counter at block 1516, the station may proceed to block 1506 to compare the modified counter value to the threshold value.

Figure 16:
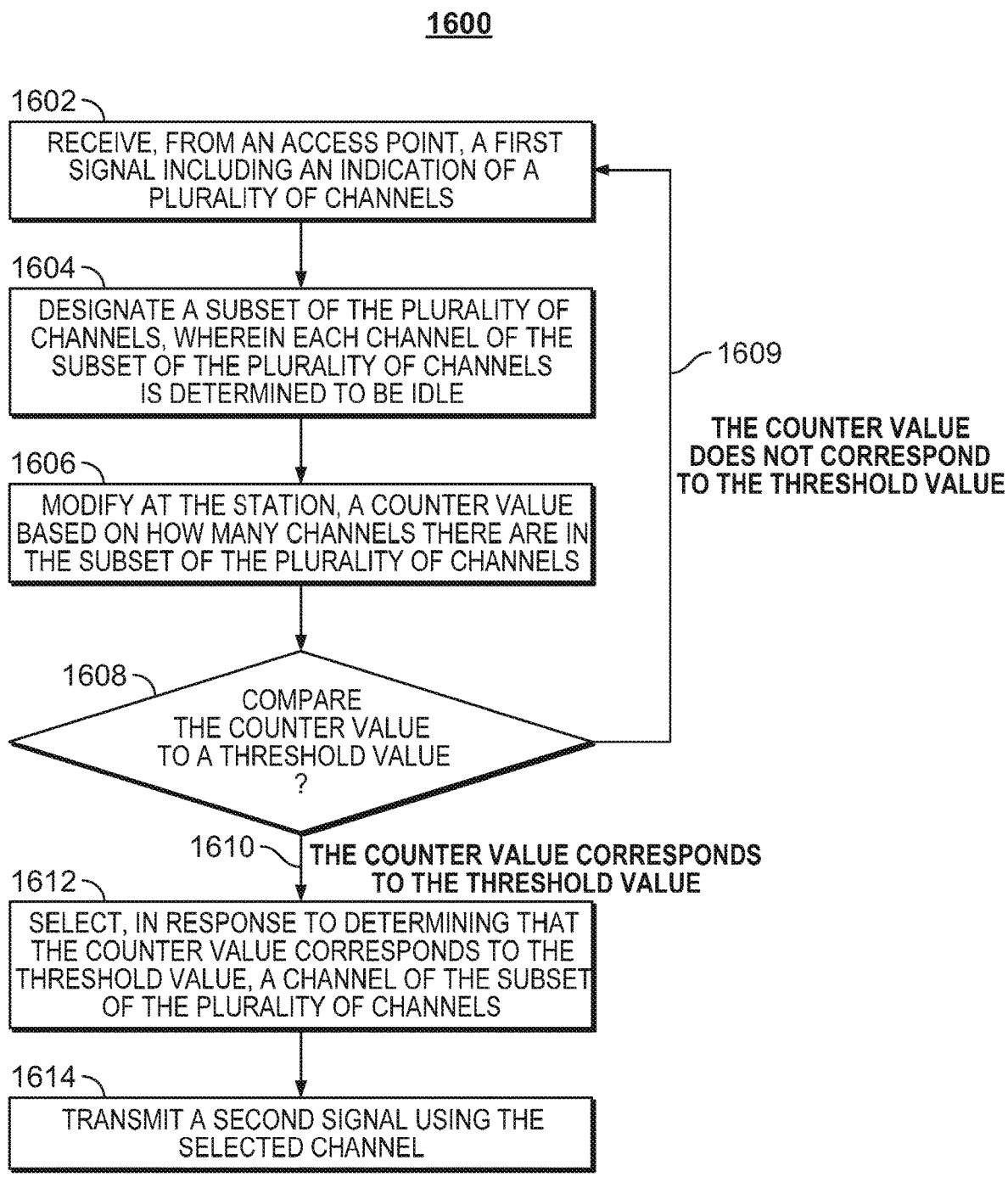
FIG. 16 shows another exemplary process for a network to perform contention-based UL OFDMA with carrier sensing, in accordance with some embodiments of the present disclosure.

FIG. 16 shows another exemplary process 1600 for a network to perform contention-based UL OFDMA utilizing carrier sensing capability of a station (e.g., STA 106, STA 108, STA 110, STA 112, STA 114 of FIG. 1), in accordance with some embodiments of the present disclosure. Process 1600 may be performed by control circuitry of any station as described in relation to FIG. 1. While process 1600 is discussed in relation to one station and access point, it is understood that any number of stations and access points may be used.

At block 1602, a station may receive, from an access point (e.g., AP 102 of FIG. 1), a first signal including data indicating a plurality of channels. In some embodiments, the plurality of channels may include sub-channels of the same channel.

In some embodiments, the first signal may be a trigger frame (such as a DL SYNC signal, described e.g., in relation to FIG. 10). In some embodiments, trigger frame may include a carrier sensing CS flag, indicating whether or not the station should perform carrier sensing. In some embodiments, steps 1604-1614 will be performed only if the CS flag indicates that the station should perform carrier sensing.

At block 1604, the station may designate an "idle" subset of plurality of channels that are determined to be idle. For example, the station may, for each channel of the plurality of channels, determine whether that channel is busy or idle. The station may perform such determination by performing PHY carrier sensing, virtual carrier sensing, or any combination of the two for each channel. The station may then designate all channels of the plurality of channels that were determined to be idle as the "idle" subset of channels.

At block 1606, the station may, modify a counter value based on the how many channels are listed in the designated "idle" subset of channels. In some embodiments, the counter value may be a backoff counter value (such as a UMcounter value described e.g., in relation to FIG. 3). The station may retrieve the counter value from its internal storage using its control circuitry.

In some embodiments, if the "idle" subset of channels contains three channels, the station may modify the counter value by reducing it by "3." For example, if the counter value was "15," the counter value may be changed to "12." In some embodiments, the station may, modify the counter value based on how many channels are listed in the "idle" subset of channels in any other way.

At block 1608, the station may compare, using its control circuitry, the counter value to a threshold value. If the threshold value is 0, this may be done similarly to block 312 of FIG. 312. In some embodiments, the threshold value may be any other integer or non-integer value. The station may perform the comparison to determine whether the counter value corresponds to the threshold value. For example, the station may determine whether the counter value equals the threshold value, or whether the counter value is sufficiently close the threshold value.

If the station determines 1610 that counter value corresponds to the threshold value, the station may proceed to perform the actions of block 1612. If the station determines 1609 that counter value does not correspond to the threshold value, the station may, for example, proceed to block 1602, such that the process 1600 is repeated when a new signal (e.g., a new trigger frame) is received from the access point.

At block 1612, the station may select, in response to determining the counter value corresponds to the threshold value, a channel from the designated "idle" subset of channels. For example, the station may select the channel from "idle" subset of channels by using a pseudo-random selection process as described in relation to block 314. In some embodiments, the station may select the channel from the designated subset of idle channels by using any other random, pseudorandom, or deterministic process.

At block 1614, the station may transmit a second signal using the selected channel. In some embodiments, the station may transmit the second signal to the access point. In some embodiments, the second signal may be an "uplink" or "UL" signal as described in in relation to FIG. 2.

It is contemplated that the steps or descriptions of the above figures may be used with any other embodiment of this disclosure. In addition, one or more steps of processes 300, 700, 1200, 1400, 1500, and 1600 may be incorporated into or combined with one or more steps of any other process or embodiment. In addition, the steps and descriptions described in relation to the above figures may be done in alternative orders or in parallel to further the purposes of this disclosure. For example, each of these steps may be performed in any order or in parallel or substantially simultaneously to reduce lag or increase the speed of the system or method.

Various embodiments discussed in conjunction with FIGS. 1-16 are performed by various electronic components of one or more electronic circuits, such as but not limited to an integrated circuit, and/or the like. Various components discussed throughout this disclosure such as, but not limited to stations STA 106, STA 108, STA 110, STA 112, STA 114, access point AP 102, and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above described embodiments of the present disclosure are presented for purposes of illustration and not of limitation, and the present disclosure is limited only by the claims that follow.

What is claimed is:

1. A method for communicating with an access point, the method comprising:
   receiving at a station, from an access point, a first signal including an indication of a plurality of channels;
   modifying at the station, in response to receiving the first signal, an uplink (UL) orthogonal frequency division multiple access (OFDMA) counter value, wherein the first signal is a downlink synchronization (DL SYNC) signal;
   comparing the UL OFDMA counter value to a threshold value;
   selecting, in response to determining that the UL OFDMA counter value corresponds to the threshold value, a channel of the plurality of channels;
   determining at the station, whether the selected channel is busy or idle;
   in response to determining that the selected channel is busy, modifying the UL OFDMA counter value; and
   in response to determining that the selected channel is idle, transmitting a second signal using the selected channel.

2. The method of claim 1, wherein the second signal is transmitted to the access point.

3. The method of claim 1, wherein determining at the station, whether the selected channel is busy or idle comprises performing at least one of physical carrier sensing of the selected channel and virtual carrier sensing of the selected channel.

4. The method of claim 1, wherein determining at the station, whether the selected channel is busy or idle is performed in response to determining that the first signal includes a carrier sensing flag.

5. The method of claim 1, wherein modifying the UL OFDMA counter value in response to determining that the selected channel is busy comprises recovering the UL OFDMA counter value that existed prior to the UL OFDMA counter value being modified in response to receiving the first signal.

6. The method of claim 1, wherein modifying the UL OFDMA counter value in response to determining that the selected channel is busy comprises:
   increasing a range associated with the UL OFDMA counter value; and modifying the UL OFDMA counter value based on the increased range associated with the UL OFDMA counter value.

7. The method of claim 6, wherein modifying the UL OFDMA counter value based on the increased range associated with the UL OFDMA counter value comprises setting the UL OFDMA counter value to a value that is randomly selected from the increased range associated with the UL OFDMA counter value.

8. The method of claim 1, wherein modifying the UL OFDMA counter value in response to determining that the selected channel is busy comprises setting the UL OFDMA counter value to a value that is randomly selected from a range associated with the UL OFDMA counter value.

9. A system for communicating with an access point, the system comprising a station comprising control circuitry configured to:
receive, from an access point, a first signal including an indication of a plurality of channels, wherein the first signal is a downlink synchronization (DL SYNC) signal;
modify, in response to receiving the first signal, an uplink (UL) orthogonal frequency division multiple access (OFDMA) counter value;
compare the UL OFDMA counter value to a threshold value;
select, in response to determining the UL OFDMA counter value corresponds to the threshold value, a channel of the plurality of channels;
determine whether the selected channel is busy or idle;
in response to determining that the selected channel is busy, modify the UL OFDMA counter value; and
in response to determining that the selected channel is idle, transmit a second signal using the selected channel.

10. The system of claim 9, wherein the control circuitry is configured to transmit the second signal to the access point.

11. The system of claim 9, wherein the control circuitry is configured to determine whether the selected channel is busy or idle by performing at least one of physical carrier sensing of the selected channel and virtual carrier sensing of the selected channel.

12. The system of claim 9, wherein the control circuitry is configured to determine whether the selected channel is busy or idle in response to determining that the first signal includes a carrier sensing flag.

13. The system of claim 9, wherein the control circuitry is configured to, in response to determining that the selected channel is busy, modify the UL OFDMA counter value by recovering the UL OFDMA counter value that existed prior to the UL OFDMA counter value being modified in response to receiving the first signal.

14. The system of claim 9, wherein the control circuitry is configured to, in response to determining that the selected channel is busy:
increase a range associated with the UL OFDMA counter value; and
modify the UL OFDMA counter value based on the increased range associated with the UL OFDMA counter value.

15. The system of claim 14, wherein the control circuitry is configured to modify the UL OFDMA counter value based on the increased range associated with the UL OFDMA counter value by setting the UL OFDMA counter value to a value that is randomly selected from the increased range associated with the UL OFDMA counter value.

16. The system of claim 9, wherein the control circuitry is configured to, in response to determining that the selected channel is busy, modify the UL OFDMA counter value by setting the UL OFDMA counter value to a value that is randomly selected from a range associated with the UL OFDMA counter value.

17. A method for communicating with an access point, the method comprising:
receiving at a station, from an access point, a first signal including an indication of a plurality of channels, wherein the first signal is a downlink synchronization (DL SYNC) signal;
designating at the station, a subset of the plurality of channels, wherein each channel of the subset of the plurality of channels is determined to be idle;
modifying at the station, an uplink (UL) orthogonal frequency division multiple access (OFDMA) counter value based on how many channels there are in the subset of the plurality of channels;
comparing the UL OFDMA counter value to a threshold value;
selecting, in response to determining that the UL OFDMA counter value corresponds to the threshold value, a channel of the subset of the plurality of channels; and
transmitting at the station, a second signal using the selected channel.

18. The method of claim 17, wherein the second signal is transmitted to the access point.

19. The method of claim 17, wherein determining whether each channel of the subset of the plurality of channels is idle comprises performing at least one of physical carrier sensing of that channel and virtual carrier sensing of that channel.

20. The method of claim 17, wherein determining whether each channel of the subset of the plurality of channels is idle is performed in response to determining that the first signal includes a carrier sensing flag.

* * * * *